(12) United States Patent
Velayuthaperumal et al.

(10) Patent No.: US 10,896,088 B2
(45) Date of Patent: Jan. 19, 2021

(54) METADATA RECOVERY MECHANISM FOR PAGE STORAGE

(71) Applicant: Seagate Technology LLC, Cupertino, CA (US)

(72) Inventors: Gomathirajan Authoor Velayuthaperumal, Bangalore Karnataka (IN); Adam Thomas Wolinski, Firestone, CO (US); Jeffery L. Shellhamer, Erie, CO (US); Ian Robert Davies, Longmont, CO (US); Douglas William Dewey, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 141 days.

(21) Appl. No.: 16/191,929

(22) Filed: Nov. 15, 2018

(65) Prior Publication Data
US 2020/0159621 A1   May 21, 2020

(51) Int. Cl.
*G06F 11/00* (2006.01)
*G06F 11/10* (2006.01)
*G06F 11/20* (2006.01)
*G06F 3/06* (2006.01)

(52) U.S. Cl.
CPC ........ *G06F 11/1076* (2013.01); *G06F 3/064* (2013.01); *G06F 3/0619* (2013.01); *G06F 3/0689* (2013.01); *G06F 11/2094* (2013.01); *G06F 2211/1088* (2013.01)

(58) Field of Classification Search
CPC .............................................. G06F 2211/1088
See application file for complete search history.

(56) References Cited

U.S. PATENT DOCUMENTS

| | | | |
|---|---|---|---|
| 5,632,012 A * | 5/1997 | Belsan | G06F 11/1076 714/6.12 |
| 5,819,109 A | 10/1998 | Davis | |
| 6,418,068 B1 | 7/2002 | Raynham | |
| 6,715,116 B2 | 3/2004 | Lester et al. | |
| 6,832,340 B2 | 12/2004 | Larson et al. | |
| 6,845,472 B2 | 1/2005 | Walker et al. | |
| 7,173,852 B2 | 2/2007 | Gorobets et al. | |
| 7,698,591 B2 * | 4/2010 | Zohar | G06F 11/1076 714/6.12 |
| 7,730,370 B2 * | 6/2010 | Francis | G06F 11/1076 714/718 |
| 7,788,541 B2 | 8/2010 | Shellhamer | |
| 7,823,011 B2 * | 10/2010 | Dholakia | G06F 11/1076 714/6.13 |
| 8,060,774 B2 | 11/2011 | Smith et al. | |
| 8,156,392 B2 | 4/2012 | Flynn et al. | |
| 8,176,405 B2 | 5/2012 | Hafner et al. | |
| 8,229,901 B2 * | 7/2012 | Nagpal | G06F 11/1076 707/692 |

(Continued)

*Primary Examiner* — Jonathan D Gibson
(74) *Attorney, Agent, or Firm* — Kagan Binder, PLLC

(57) ABSTRACT

A method includes identifying, using a controller, a first data error at a first data block stored in page metadata, the first data block having a first block logical ID. The method also includes identifying a second data block having the first block logical ID. The method also includes copying the second data block to the first data block based on the identified second data block.

20 Claims, 26 Drawing Sheets

(56) References Cited

U.S. PATENT DOCUMENTS

| | | | | |
|---|---|---|---|---|
| 8,595,595 | B1* | 11/2013 | Grcanac | G06F 11/1088 |
| | | | | 714/770 |
| 10,007,456 | B1 | 6/2018 | Chinnakkonda Vidyapoornachary et al. | |
| 2005/0060603 | A1* | 3/2005 | Pomaranski | G11C 29/52 |
| | | | | 714/6.32 |
| 2005/0073884 | A1* | 4/2005 | Gonzalez | G06F 11/106 |
| | | | | 365/185.02 |
| 2006/0090098 | A1* | 4/2006 | Le | G06F 11/2221 |
| | | | | 714/6.12 |
| 2006/0212778 | A1* | 9/2006 | Wheeler | G06F 11/106 |
| | | | | 714/764 |
| 2006/0218199 | A1* | 9/2006 | Kishi | G06F 16/215 |
| 2007/0050667 | A1* | 3/2007 | Zohar | G06F 11/1076 |
| | | | | 714/6.2 |
| 2013/0067270 | A1* | 3/2013 | Lee | G06F 11/1076 |
| | | | | 714/6.1 |
| 2014/0068319 | A1 | 3/2014 | Daly | |
| 2017/0242627 | A1* | 8/2017 | Mills | G06F 3/065 |
| 2017/0315879 | A1 | 11/2017 | Park et al. | |
| 2020/0042380 | A1* | 2/2020 | Roberts | G06F 3/0614 |

* cited by examiner

METADATA RECOVERY MECHANISM FOR PAGE STORAGE

SUMMARY

This case relates to memory scrubbing and the correction of memory errors detected during such memory scrubbing, in particular within redundant array of independent disk (RAID) storage systems.

According to basic error-correcting code (ECC) and/or cyclic redundancy check (CRC) techniques, a single bit error can be detected and corrected using redundant memory storage within a memory system. However, when more than one bit is found to be incorrect within a memory block of a memory system, that block can be marked as bad. A need therefore exists to repair or correct that bad memory block. This is a technical problem that embodiments of the present invention address.

According to the present invention, redundant memory blocks are stored separately, such as on multiple stripes, volumes, and/or back-end storage disks, in particular according to various RAID schemes. Each block has a metadata ID (or one can be derived) and is matched with other memory blocks that correspond to that ID. When a memory scrub operation occurs and a bad block is detected, a memory controller then finds a corresponding, e.g., mirrored or duplicate, good memory block to the bad memory block and copies that good memory block to the bad memory block, thus correcting the error.

According to a first aspect of the present disclosure, a method is disclosed. According to the first aspect, the method includes identifying, using a controller, a first data error at a first data block stored in page metadata, the first data block having a first block logical ID. The method also includes identifying a second data block having the first block logical ID. The method also includes copying the second data block to the first data block based on the identified second data block.

According to a second aspect of the present disclosure, a system is disclosed. According to the second aspect the system includes a hardware processor operatively coupled to a storage device. According to the second aspect, the hardware processor is configured to execute instructions, including instructions for a process for managing data. According to the second aspect, the process includes identifying a first data error at a first data block stored in page metadata, the first data block having a first block logical ID. The process also includes identifying a second data block having the first block logical ID. The process also includes copying the second data block to the first data block based on the identified second data block.

According to a third aspect of the present disclosure, a controller apparatus is disclosed. According to the third aspect, the controller apparatus includes a hardware processor operatively coupled to a management controller, a storage device input/output controller, and a memory device. Also according to the third aspect, the hardware processor is configured to execute instruction, including instructions for a process for managing data. The process includes identifying a first data error at a first data block stored in page metadata, the first data block having a first block logical ID. The process also includes identifying a second data block having the first block logical ID. The process also includes copying the second data block to the first data block based on the identified second data block.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1A:
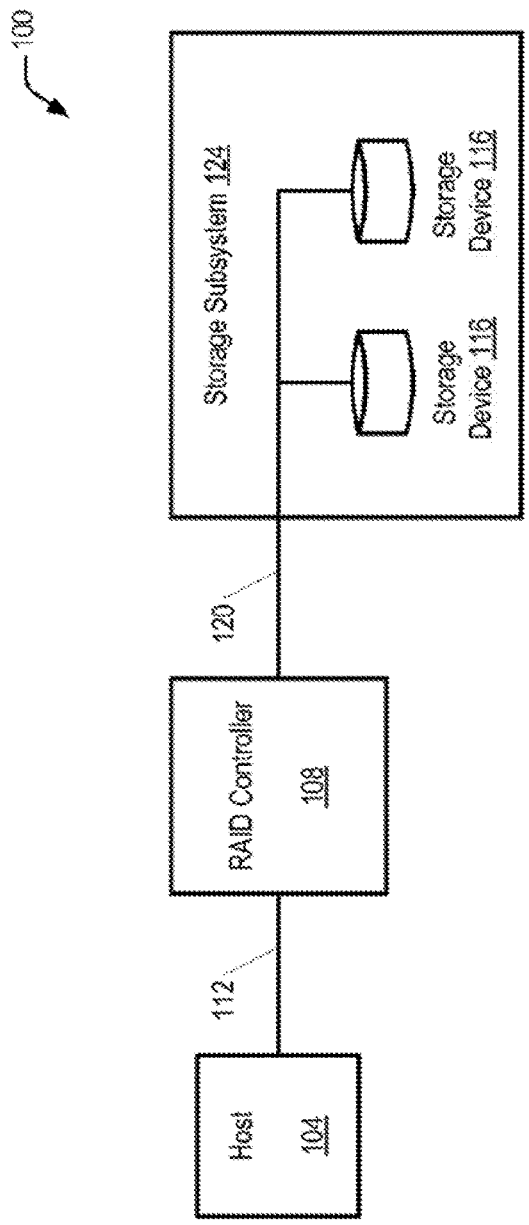
FIG. 1a is a block diagram illustrating an external RAID embodiment of a RAID storage system, according to various embodiments.

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times. Examples of systems that can provide such advantages can be found in the various redundant array of independent disks (RAID) levels that have been developed.

RAID systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller can control a group of multiple physical storage devices in such a manner as to present a single logical storage device (or multiple logical storage devices) to a computer operating system. RAID controllers employ the techniques of data striping and data redundancy to increase performance and data availability.

Not all RAID levels provide data redundancy, however. For example, a RAID 0 array uses a striping technique to store data stripe-wise across multiple storage devices, but does not provide a copy of the data stored elsewhere on storage devices of the array that can be used to reconstruct data if a storage device fails. RAID levels that provide redundancy are divided into two categories: those that are parity-based, and those that are mirror-based. Parity-based RAID levels calculate parity from data that is written to the RAID array, and store it on a different storage device than the storage devices used to store the data itself. Parity-based RAID levels include RAID levels 3, 4, 5, 6, 3+0, 4+0, and 5+0. Mirror-based RAID levels store a copy of data written to the RAID array to a different storage device from the device used to store the data itself. Mirror-based RAID levels include, for example, RAID levels 1 and 1+0.

According to RAID level 1, data stored in a primary storage device is mirrored to a secondary storage device. Therefore, RAID level 1 requires at least two storage devices to implement. Furthermore, if more than two storage devices are desired, additional storage devices are added, such as in pairs. That is, RAID level 1 typically requires an even number of storage devices. During normal operation, write operations result in a primary copy of data being written to the primary storage device and a mirrored copy being written to the secondary storage device, and read operations are made with respect to the copy of data on either the primary or secondary storage device. If one storage device within a RAID level 1 array fails, data stored on that storage device can be rebuilt onto a replacement storage device by copying the data stored on the failed storage device's companion storage device to the replacement storage device. Another example of a mirror-based RAID level is RAID level 1+0. RAID level 1+0 mirrors a striped set of storage devices, and requires a minimum of four storage devices to implement. Data is striped across multiple storage devices, which improves I/O performance for RAID 1+0 compared with RAID 1.

Other RAID levels combine data storage devices with parity storage devices, which is either stored on a dedicated parity storage device or distributed among data storage devices. Examples of such arrangements include RAID levels 3, 4, 5, 6, 3+0, 4+0, and 5+0. Although such arrangements provide for fault tolerance, and can provide somewhat improved I/O performance, they all require at least three storage devices to implement, and require fairly complex controller and parity generation circuitry or software. All of the parity-based RAID levels can tolerate a single storage device failure, but RAID 6 can tolerate up to two simultaneous storage device failures.

RAID subsystems commonly employ spare storage devices. Spare storage devices, such as hot spare storage devices, are able to replace storage devices identified by the RAID controller, software, or system administrator as failed or failing storage devices. Rebuild of data from a failed or failing storage device to an available (e.g., hot) spare storage device may occur as directed by a system administrator, or as a result of an automated rebuild process within the RAID controller or software.

In computer terminology, a check condition typically occurs when a small-computer system interface (SCSI) device needs to report an error. SCSI communication takes place between an initiator and a target. The initiator sends a command to the target which then responds. SCSI commands are sent in a command descriptor block (CDB). At the end of the command the target returns a status code byte which can be 00h for success, 02h for a check condition (error), or 08h for busy. When the target returns a check condition in response to a command, the initiator usually then issues a SCSI request sense command in order to obtain more information. During the time between the reporting of a check condition and the issuing of a request sense command, the target is in a special state called contingent allegiance.

In most cases, a storage device will detect and correct internal media errors via error correction code(s) (ECC) and various retry mechanisms. When the storage device is unable to correct the data, it will post a check condition in final status. The controller will then issue a request sense command to the storage device and process the sense data. If the sense data indicates a media error, the controller can correct the bad data using RAID parity data for a parity-based array and RAID mirror data for a mirror-based array. Data is read from the good storage devices (the storage devices not reporting the media error), data is generated corresponding to the data on the storage device reporting the media error, and data is written to an available spare storage device—which then can replace the storage device with the media error in the redundant array.

Various RAID controller embodiments described herein have on-board verify or scrub utilities that can be used to check the integrity of a redundant RAID array. Verify utilities for parity-based arrays read data, calculate parity, and compare to stored parity. The verify utilities for mirror-based arrays read data and compare to mirrored data on other storage devices. The scrub utilities perform the same comparison as verify utilities, plus they also may perform reading/comparing metadata in addition to the user data, reset SMART data (clears drive reports after processing any available data), and create a record of all data miscompares.

Verify or scrub utilities may be utilized in other than a user-initiated fashion. For example, such background checking as required here may be part of the core operation of a storage controller, and conducted at all times or at scheduled times on all data read from storage devices. It may also be performed by host software through a host bus adapter (HBA), software in an intermediate storage appliance or switch, or within a storage controller in any combination of hardware, software, or firmware.

Presently, a RAID component (such as a storage controller) e.g., in the background, asynchronously reads from physical disks managed by the RAID component, and if the RAID component receives a media error will attempt to correct it using various forms of erasure encoding. The RAID component can also read entire data stripes in order to check that the parity stored is consistent with the data in the data stripe. If it is not found to be consistent, then it has detected a problem but it may not know how to restored or determine corrected data (depending on the RAID layer etc. per standard RAID algorithms for RAID levels 5 and 6)

Various schemes disclosed herein include cooperation with the higher layers (e.g., cache storage and/or paged storage) to expand the detection and correction capability of background data problem detection/correction provided by this scrubbing.

Referring now to FIG. 1a, a block diagram illustrating an external RAID embodiment of RAID storage system 100 of the present invention is shown. Host computer 104 writes and reads data to and from RAID controller 108 across host bus 112. Such a system may have multiple host computers 104 coupled to multiple RAID controllers 108 across multiple host buses 112. RAID controller 108 receives write requests from host computers 104, formats data according to well-known RAID storage methods, and writes the data to multiple storage devices 116 across storage bus 120. Typically, storage devices 116 are located within storage subsystem 124, which provides redundant power and cooling for storage devices 116, and hot-pluggable access for each storage device 116. At least two storage devices are required to create a redundant RAID configuration (e.g., RAID 1), although more storage devices may be used. The upper limit is dictated by the RAID level supported, the number of storage devices that may be accommodated by storage subsystem 124, and design constraints of RAID controller 108.

Host computers 104 may be any type of computer, such as a personal computer (PC), server, workstation, or supercomputer. Host bus 112 is any appropriate interconnection that allows direct or networked communication between host computers 104 and RAID controllers 108. Common interconnections for host bus 112 include Fibre Channel, SCSI, SSA, Infiniband, iSCSI, Serial attached SCSI (SAS), non-volatile memory host controller interface specification (NVMe), or Ethernet, although any such suitable bus may be utilized. Such a bus may be in a direct connect, bus, loop, fabric, or any other topology, and may be part of a larger communication or storage network. Storage devices 116 include disk drives, tape drives, optical drives, solid state drives, memory devices, or any other appropriate devices intended for mass storage of data. Storage bus 120 is any appropriate interconnection that allows direct or networked communication between RAID controllers 108 and storage devices 116. Common interconnections for storage bus 120 include Fibre Channel, SCSI, SSA, Infiniband, iSCSI, serial attached SCSI (SAS), non-volatile memory host controller interface specification (NVMe), parallel ATA (ATA), serial ATA (SATA), or Ethernet, although any such suitable bus may be utilized. Such a bus may be in a direct connect, bus, loop, fabric, or any other topology, and may be part of a larger storage network. A storage bus 120 to a specific storage device 116 may be a different type or topology than another storage bus 120 to a different storage device 116. Multiple storage buses 120 may be present, with a minimum of one storage device 116 per storage bus 120.

Figure 1B:
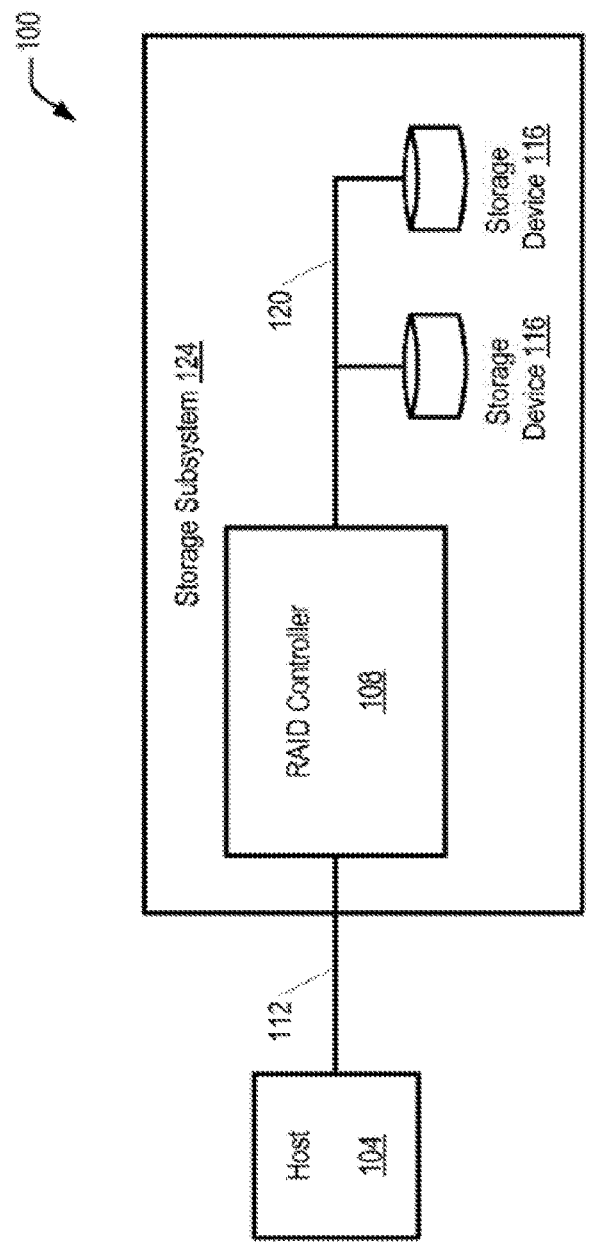
FIG. 1b is a block diagram illustrating another external RAID embodiment of a RAID storage system, according to various embodiments.

Referring now to FIG. 1b, a block diagram illustrating another external RAID embodiment of RAID storage system 100 of the present invention is shown. This RAID storage system 100 is similar to the RAID storage system 100 of FIG. 1a, except that RAID controller 108 is within storage subsystem 124. Such an approach is often less costly than the embodiment of FIG. 1a since the packaging, power supplies, and cooling for RAID controller 108 is combined with storage devices 116. This approach may also allow a lower cost storage bus 120 to be used, since only connections internal to storage subsystem 124 are required.

Figure 2A:
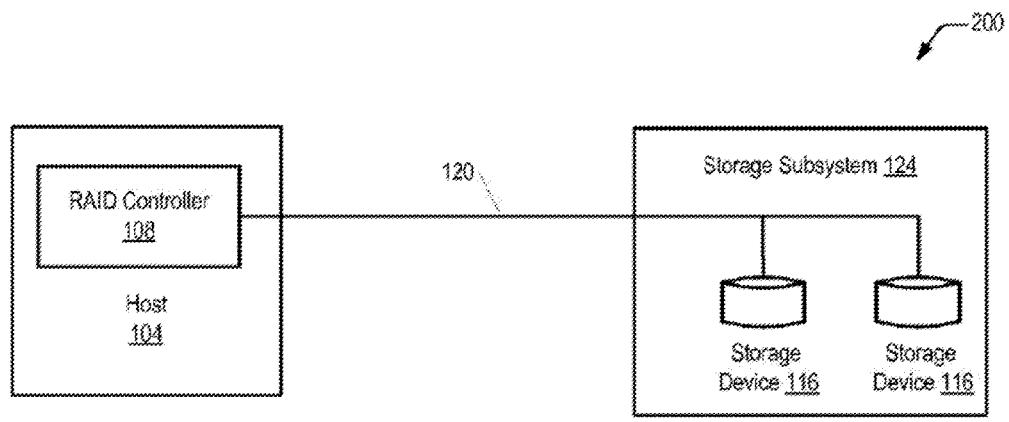
FIG. 2a is a block diagram illustrating an internal RAID embodiment of a RAID storage system, according to various embodiments.

Referring now to FIG. 2a, a block diagram illustrating an internal RAID embodiment of RAID storage system 200 of the present invention is shown. The RAID storage system 200 has a RAID controller 108 within host computer 104, instead of external to a host computer as shown in FIGS. 1a and 1b. RAID controller 108 is connected to storage devices 116 in storage subsystem 124 by storage bus 120. RAID controller 108 of FIG. 2a is coupled to host computer 104 by a connection not shown in FIG. 2a. Such a connection is typically provided by a common local bus such as PCI, PCI-X, PCI Express, or Rapid I/O, although any such local bus may be used to couple RAID controller 108 to host computer 104.

Figure 2B:
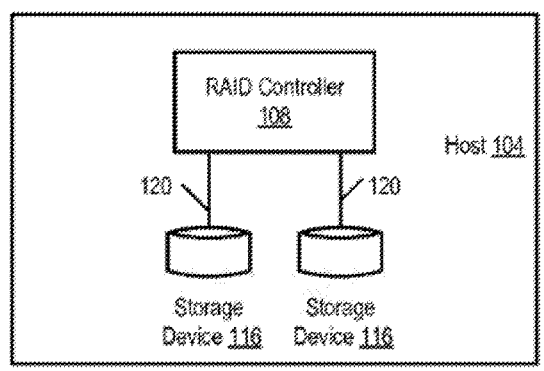
FIG. 2b is a block diagram illustrating another internal RAID embodiment of a RAID storage system, according to various embodiments.

Referring now to FIG. 2b, a block diagram illustrating another internal RAID embodiment of RAID storage system 200 of the present invention is shown. This RAID storage system 200 locates RAID controller 108, storage buses 120, and storage devices 116 within host computer 104. This arrangement is sometimes used in desktop computers in order to provide RAID functionality at minimal hardware cost. RAID controller 108 is often implemented within the motherboard chipset of host computer 104, or may be a separate add-in card. Storage devices 116 are located within host computer 104, and usually utilize low-cost storage buses 120 such as ATA or SATA. Storage devices 116 may share a single storage bus 120, or use multiple storage buses 120.

Figure 2C:
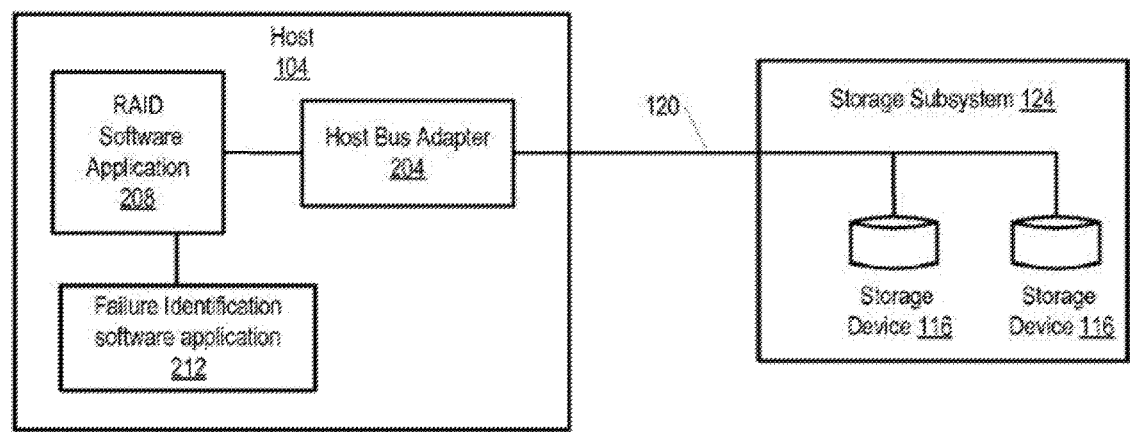
FIG. 2c is a block diagram illustrating yet another internal RAID embodiment of a RAID storage system, according to various embodiments.

Referring now to FIG. 2c, a block diagram illustrating yet another internal RAID embodiment of RAID storage system 200 of the present invention is shown. This RAID storage system 200 utilizes host bus adapter 204 to provide connection between host computer 104 and storage devices 116 in storage subsystem 124. Host bus adapter 204 is coupled to host computer 104 by a local bus connection as discussed earlier. Host adapter 204 does not provide RAID functionality, so RAID software application 208 is provided in the operating system or as a separate device driver or software application in host computer 104. RAID software application 208 receives I/O requests from the operating system of host computer 104, and converts the I/O request into individual reads and writes to storage devices 116. It also manages striping across storage devices, manages storage device failures and bad block replacement, and performs all other functions performed by RAID controller 108. Another software application, a failure identification software application 212, is shown in FIG. 2c. Failure identification software application 212 identifies failing storage devices 116, according to the present invention, and will be described later in more detail. This application 212 communicates with RAID software application 208, and may also be combined with RAID software application 208 as a single, unified software application. Failure identification software application 212 may also be configured as part of RAID controller 108 in other embodiments taught herein, or as a software application running on a computer that communicates with RAID controller.

Figure 3:
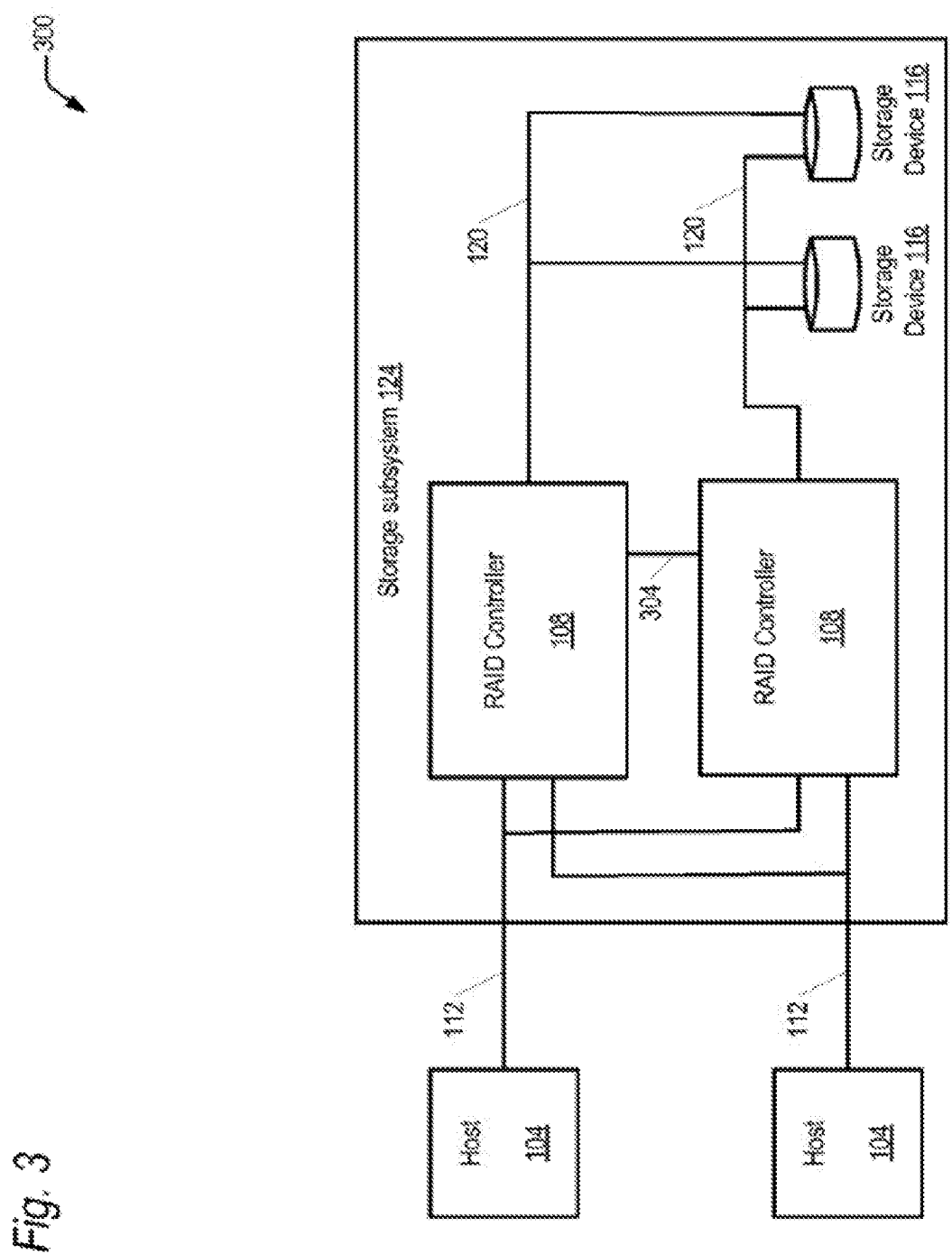
FIG. 3 is a block diagram illustrating another external RAID embodiment of a RAID storage system 300, according to various embodiments.

Referring now to FIG. 3, a block diagram illustrating another external RAID embodiment of RAID storage system 300 of the present invention is shown. This configuration of RAID storage system 300 is commonly found in mass storage applications, where no single point of failure can be tolerated. Host computers 104 provide separate host bus interconnection 112 to each of two redundant RAID controllers 108. Each of redundant RAID controllers 108 provides a connection independent from the other RAID controller 108 to each of storage devices 116 through a separate storage bus 120.

Typically, both RAID controllers 108 and storage devices 116 are within storage subsystem 124, although additional storage subsystems 124 may be provided to support more storage devices 116. RAID controllers 108 typically operate in an active-active configuration, where both controllers perform I/O operations in normal operation, and where a surviving RAID controller 108 takes over for a failing RAID controller 108 upon detecting that RAID controller 108 is failing. Intercommunication bus 304 couples each of the two RAID controllers 108 directly, and provides health monitoring and communications between RAID controllers 108 so that each RAID controller 108 can identify when it needs to take over for a failing RAID controller 108. In lieu of intercommunication bus 304, RAID controllers 108 may instead communicate and monitor health of the other controller over any host bus 112 or storage bus 120, as long as the host bus 112 or storage bus 120 is connected to both RAID controllers 108.

As was taught in the description of FIG. 2c, failure identification software application 212 may run on each RAID controller 108, or host computer 104. If failure identification software application 212 runs on each of RAID controller 108, intercommunication bus 304, host bus 112, or storage bus 120 may be used to communicate results of failure identification testing between RAID controllers 108. If failure identification software application 212 runs on a host computer 104, a host bus 112 may be used to communicate results of failure identification to either or both RAID controllers 108.

Figure 4A:
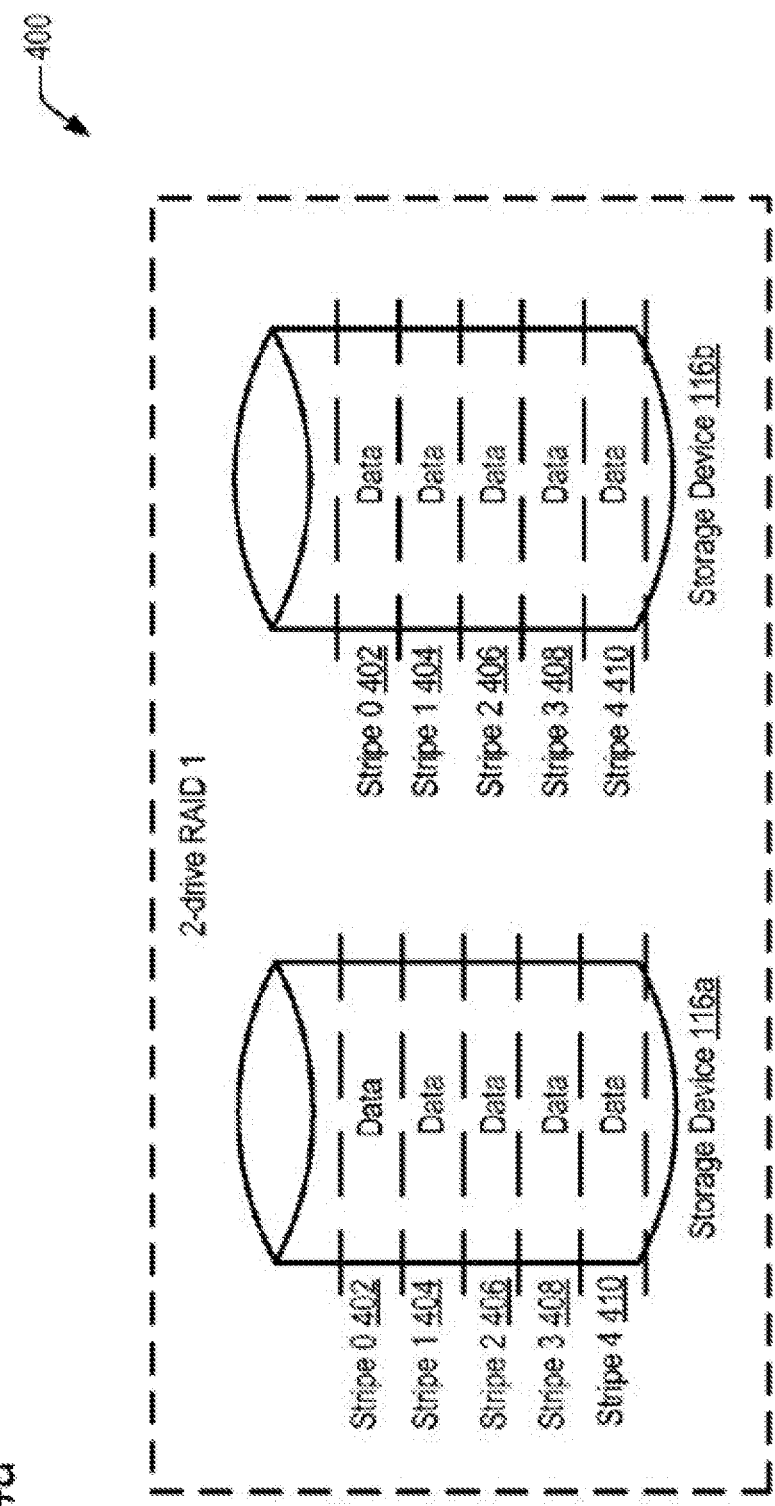
FIG. 4a is a block diagram illustrating organization of data on storage devices 116 for a 2-drive RAID 1 400 configuration, according to various embodiments.

Referring now to FIG. 4a, a block diagram illustrating organization of data on storage devices 116 for a 2-drive RAID 1 400 configuration of the present invention is shown. The 2-drive RAID 1 configuration 400 can be a redundant, or "mirrored," RAID configuration that uses two storage devices 116. Data is organized on each storage device 116 in equal-size stripes 402-410, where stripe size depends on tradeoffs between performance and storage efficiency and design limitations. In one embodiment, the size of a stripe is 128 blocks of 512 bytes, for a total of 65,536 bytes. Storage devices 116 are usually addressed by RAID controller 108 as a number of data blocks to be stored at a starting logical block address (LBA) of a physical storage device 116. For a write from host computer 104 to RAID controller 108, RAID controller 108 determines which stripe 402-410 of storage device 116 the write should initially be directed to. If the size of the write exceeds the available space within the current stripe 402-410 of storage device 116, the write continues in the next stripe 402-410 of the same storage device 116. This continues until all data in the I/O request from host computer 104 has been written to storage device 116. Once the write to storage device 116a is completed, RAID controller 108 performs the same write in the same stripe(s) to the other storage device 116b. Although five stripes 402-410 are depicted in FIG. 4a for ease of illustration, it should be understood that storage devices commonly have many hundreds or thousands of stripes. For the 2-drive RAID 1 configuration 400 shown, the data stored on storage device 116a should be identical to the data stored on storage device 116b before or after any write operation.

Figure 4B:
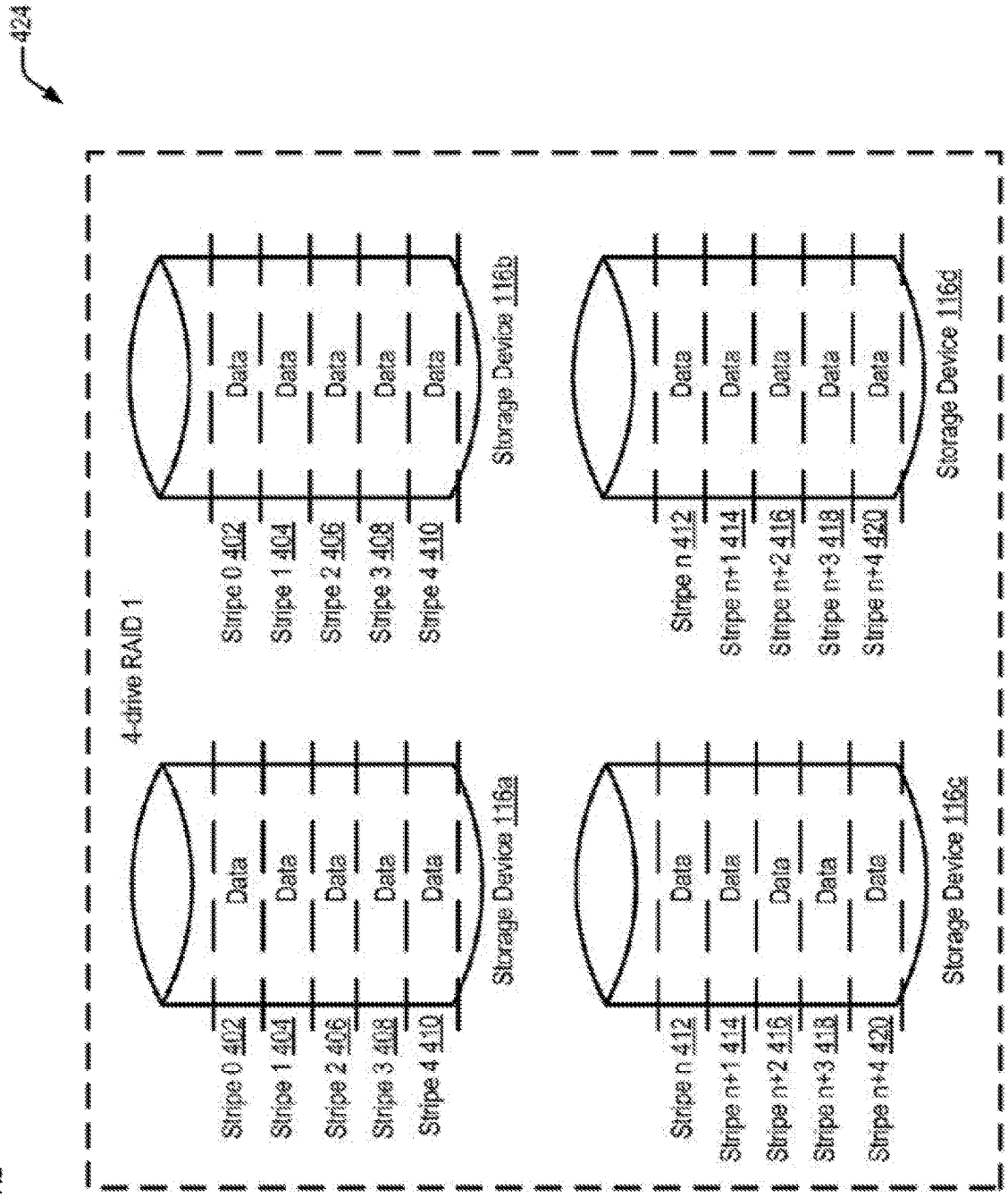
FIG. 4b is a block diagram illustrating organization of data on storage devices 116 for a 4-drive RAID 1 configuration 424, according to various embodiments.

Referring now to FIG. 4b, a block diagram illustrating organization of data on storage devices 116 for a 4-drive RAID 1 configuration 424 of the present invention is shown. Four storage devices 116a, 116b, 116c, and 116d are shown. Data on storage device 116a is mirrored to storage device 116b, and data on storage device 116c is mirrored to storage device 116d. Thus, the 4-drive RAID 1 configuration 424 of FIG. 4b is simply an expansion of the 2-drive RAID 1 configuration 400 of FIG. 4a, by two storage devices 116c and 116d. The stripes of data n 412 to n+4 420 on storage devices 116c and 116d are a concatenation of the stripes on storage devices 116a and 116b, with stripe n 412 of storage devices 116c and 116d being addressed immediately after the last stripe of storage devices 116a and 116b, respectively. If stripe 4 410 is the last stripe of storage devices 116a and 116b, then stripe n 412 of storage devices 116c and 116d is the next consecutively addressed stripe of 4-drive RAID 1 array 424.

Figure 4C:
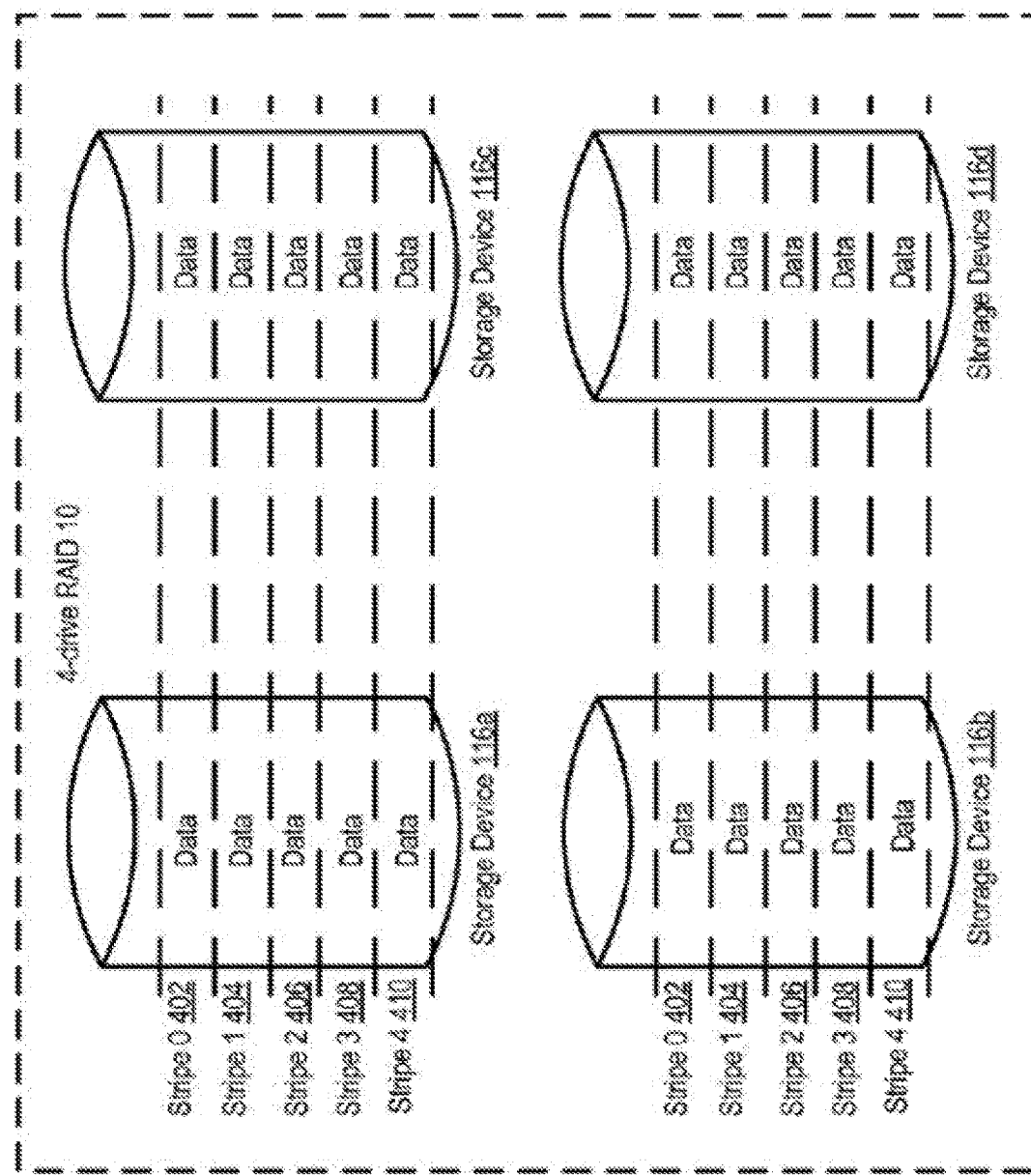
FIG. 4c is a block diagram illustrating organization of data on storage devices 116 for a 4-drive RAID 1+0 configuration 428, according to various embodiments.

Referring now to FIG. 4c, a block diagram illustrating organization of data on storage devices 116 for a 4-drive RAID 1+0 configuration 428 of the present invention is shown. Although this configuration uses 4 storage devices 116a-116d, the same as 4-drive RAID 1 configuration 424, data is organized differently. In 4-drive RAID 1 configuration 424, a stripe only spans a single storage device 116. In 4-drive RAID 1+0 configuration 428, a stripe spans two storage devices 116a and c or 116b and d. If data is being written by RAID controller 108 to stripe 2 406 of storage device 116a, and the write is larger than the available space in stripe 2 406 of storage device 116a, RAID controller 108 will continue the write in stripe 2 406 of storage device 116c. This is different than was shown in FIG. 4b, where if the write was larger than the available space in stripe 2 406 of storage device 116a, RAID controller 108 will continue the write in stripe 3 408 of storage device 116a. If the data is being written by RAID controller 108 to stripe 2 406 of storage device 116c, and the write is larger than the available space in stripe 2 406 of storage device 116c, RAID controller 108 will continue the write in stripe 3 408 of storage device 116a. Once a write is completed to storage devices 116a and c, RAID controller 108 repeats the same write to the mirrored stripes on storage devices 116b and d. Stripe 0 402 on storage devices 116a and c is mirrored to stripe 0 402 on storage devices 116b and d. Stripe 1 404 on storage devices 116a and c is mirrored to stripe 1 404 on storage devices 116b and d, in a continuing fashion.

Figure 4D:
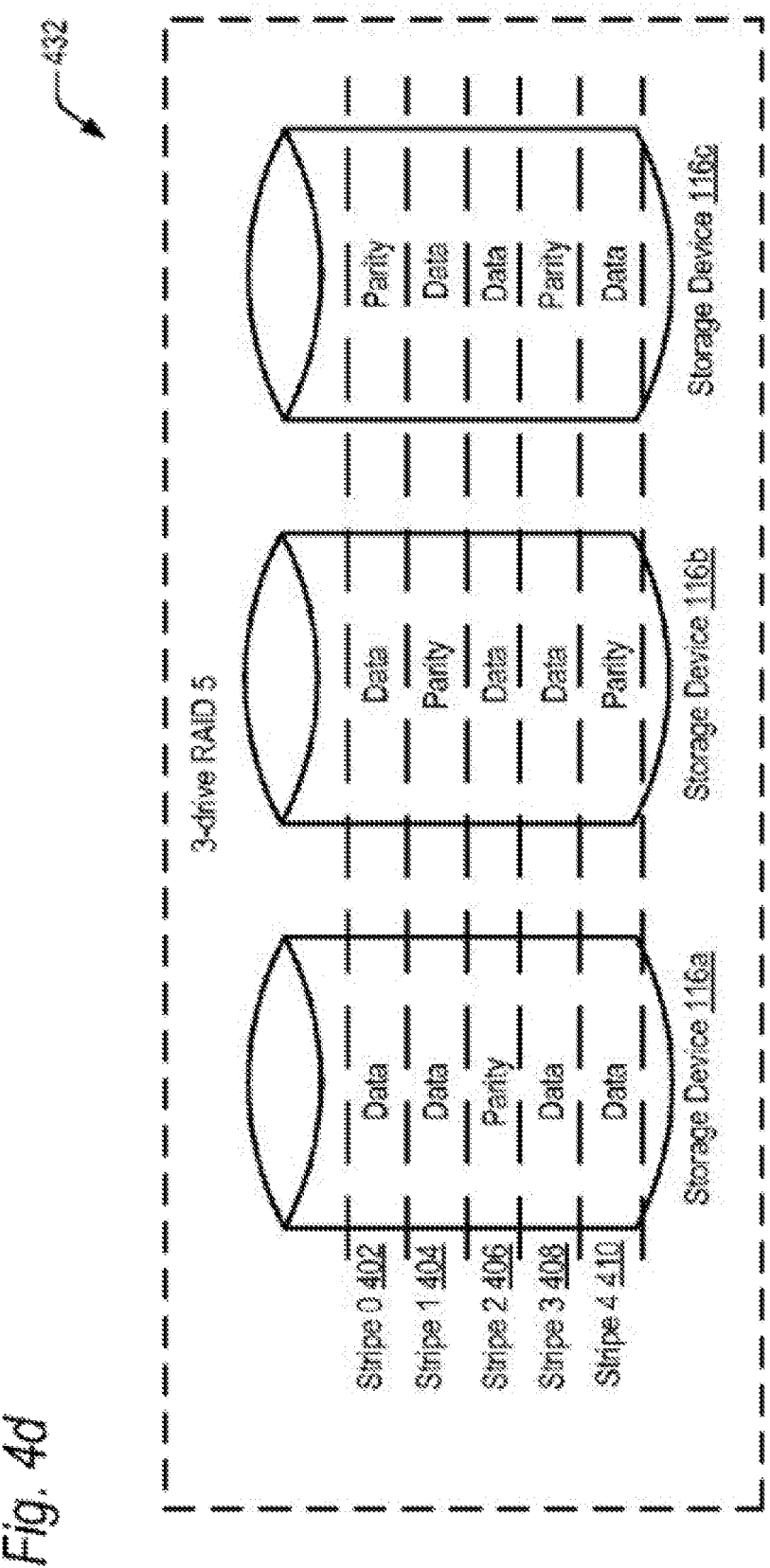
FIG. 4d is a block diagram illustrating organization of data on storage devices 116 for a 3-drive RAID 5 configuration 432, according to various embodiments.

Referring now to FIG. 4d, a block diagram illustrating organization of data on storage devices 116 for a 3-drive RAID 5 configuration 432 of the present invention is shown. The 3-drive RAID 5 configuration 432 uses two storage devices 116 to store data, with a third storage device 116 to store parity information. Parity information is distributed among each storage device 116 in a rotating fashion, with the first parity block in stripe 0 402 of storage device 116c, the second parity block in stripe 1 404 of storage device 116b, the third parity block in stripe 2 406 of storage device 116a, the fourth parity block in stripe 3 408 of storage device 116c, and so on. Assignment of parity blocks continues in this fashion to the last stripe on storage devices 116a, 116b, and 116c. All other blocks on storage devices 116a-c store data. As is well known in the art, the parity block within a stripe 402-410 is generated by exclusive-OR-ing (XORing) the data in the data blocks within the same stripe 402-410. Therefore, for stripe 0 402, the parity block in storage device 116c is generated by XORing the data in stripe 0 402 of storage device 116a with the data in stripe 0 402 of storage device 116b. After the data in a stripe has been written and the parity calculated and written, the exclusive OR (XOR) of the data and parity within the same stripe should be equal to zero.

Figure 4E:
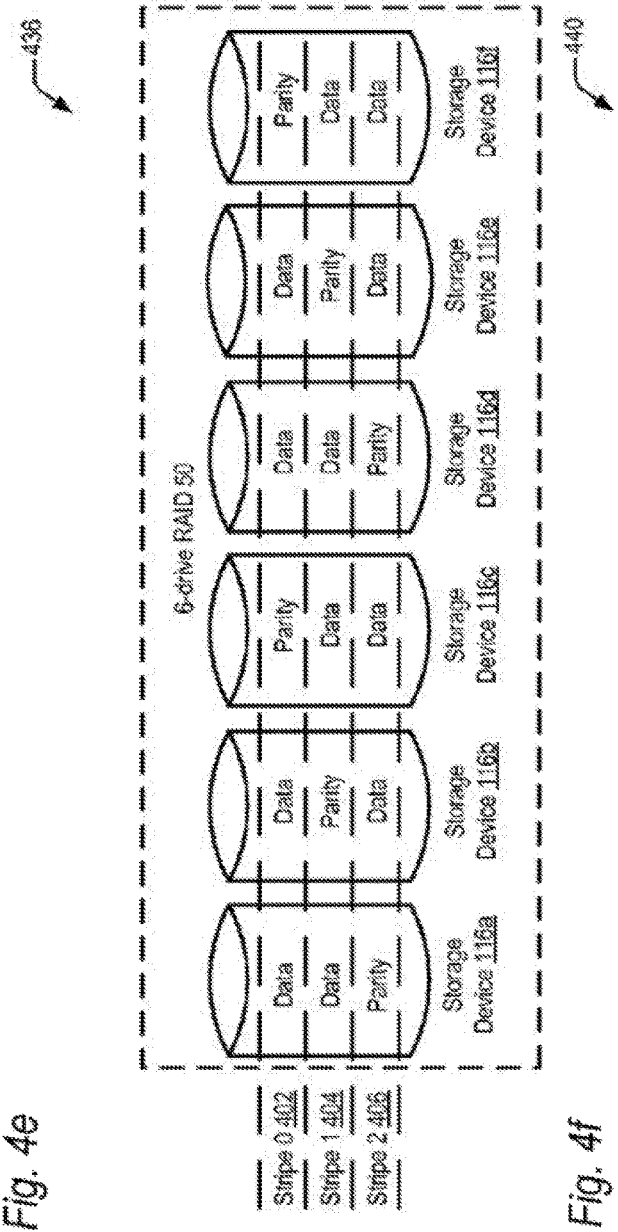
FIG. 4e is a block diagram illustrating organization of data on storage devices 116 for a 6-drive RAID 5+0 configuration 436, according to various embodiments.

Referring now to FIG. 4e, a block diagram illustrating organization of data on storage devices 116 for a 6-drive RAID 5+0 configuration 436 of the present invention is shown. In the embodiment depicted, the RAID 5+0 array 436 is formed by striping two different 3-drive RAID 5 arrays. The 6-drive RAID 5+0 configuration uses storage space equal to four storage devices 116 to store data, with storage space equal to two storage devices 116 to store parity information. Parity is rotated within each three storage device subgroup, with storage devices 116a, b, and c being the first subgroup, and storage devices d, e, and f being the second subgroup. Parity is also calculated within a subgroup, with the parity in a stripe of a subgroup equal to the XOR of the data storage devices within the same stripe of the subgroup. Thus, the parity in stripe 1 404 of storage device 116e is the XOR of the data in stripe 1 404 of storage device 116d and the data in stripe 1 404 of storage device 116f. For writes to stripe 1 404 that begin in the first subgroup and span the first and second subgroups, data is written to stripe 1 404 of storage devices 116a and c in the first subgroup addressed stripe, next parity is calculated and written to stripe 1 404 of storage device 116b. Third, data is written to storage devices 116d and f in the second subgroup addressed stripe, and finally parity is calculated and written to stripe 1 404 of storage device 116e. Alternatively, for a write beginning in the second subgroup of storage devices 116 and spanning both subgroups, the second subgroup must be written first, and the first subgroup must be written second. Data is written to stripe 1 404 of storage devices 116d and f in the second subgroup addressed stripe, next parity is calculated and written to stripe 1 404 of storage device 116e. Third, data is written to storage devices 116a and c in the next available stripe in the first subgroup—stripe 2 406, and finally parity is calculated and written to stripe 2 406 of storage device 116b.

Figure 4F:
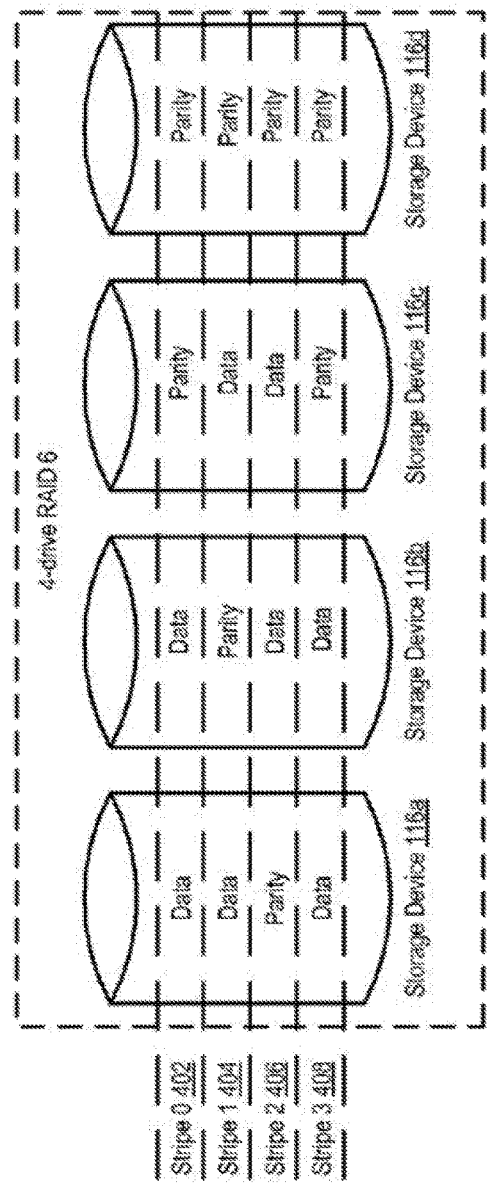
FIG. 4f is a block diagram illustrating organization of data on storage devices 116 for a 4-drive RAID 6 configuration 440, according to various embodiments.

Referring now to FIG. 4f, a block diagram illustrating organization of data on storage devices 116 for a 4-drive RAID 6 configuration 440 of the present invention is shown. RAID 6 is unique in that it allows up to two storage devices to fail and still be able to read data from the array. In the RAID 6 embodiment shown, within each stripe 402-408, two storage devices 116 have capacity allocated to storing data, with the other two storage devices 116 of capacity storing generated parity information. In stripe 0 402, storage devices 116a and b store data, while storage devices 116c and 116d store generated parity information. In stripe 2 406, storage devices 116b and c store data, while storage devices 116a and 116d store generated parity information. Written data proceeds in a stripe wise fashion, as previously discussed with respect to FIG. 4d for the 3-drive RAID 5 configuration 432.

Figure 5:
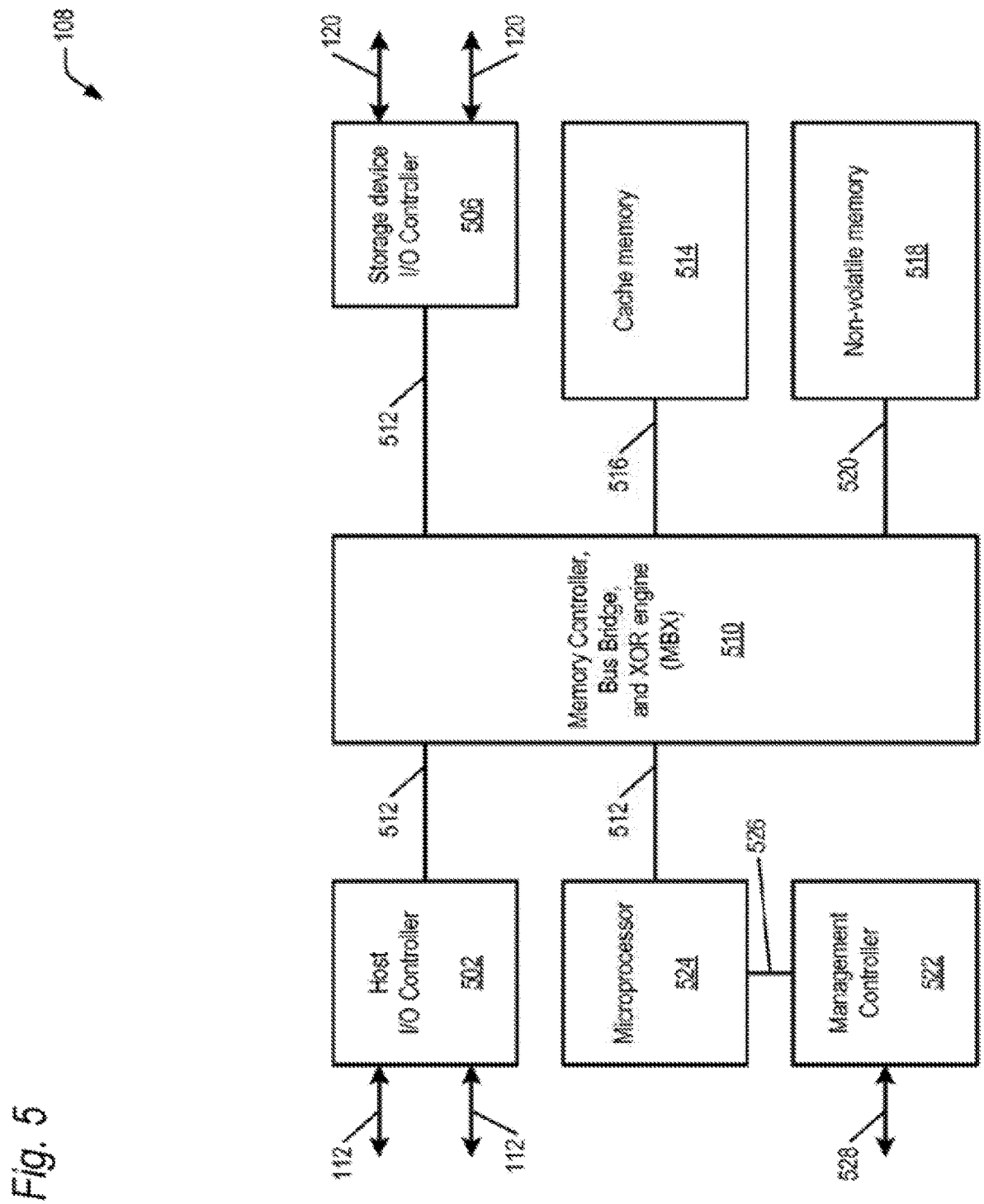
FIG. 5 is a block diagram illustrating RAID controller 108 of FIGS. 1 through 3, according to various embodiments.

Referring now to FIG. 5, a block diagram illustrating RAID controller 108 of the present invention is shown. Host I/O controller 502 receives I/O requests from host computers 104 attached to host buses 112, and transfers data to and from memory controller, bus bridge, and XOR engine (MBX) 510. There may be single or multiple host I/O controllers 502 and each host I/O controller 502 may have one or multiple host I/O ports that connect to host buses 112. Host buses 112 may be a single bus or multiple buses, and may be different types or topologies of buses according to the needs of the system the RAID controller 108 is employed within. Host buses 112 may also be an external bus type commonly used with external RAID controllers 108, as previously discussed with respect to FIG. 1a, or may be a local bus of a computer as described with respect to FIG. 2a.

Storage device I/O controller 506 transfers data to and from storage devices 116 over storage buses 120, to MBX 510. Storage device I/O controller 506 is coupled to MBX 510 by another local bus 512, which is typically a PCI, PCI-X, or PCI express bus, but may be any type of suitable local bus. There may be single or multiple storage device I/O controllers 506 and each storage device I/O controller 506 may have one or multiple storage device I/O ports that connect to storage buses 120. Storage buses 120 may be any suitable bus that can interface to storage devices, as discussed with reference to FIG. 1a.

In an embodiment, MBX 510 transfers write data from host I/O controller 502 to cache memory 514, and read data from storage device I/O controller 506 to cache memory 514. MBX 510 is coupled to host I/O controller 502 and storage device I/O controller 506 each by a local bus 512, which is typically a PCI, PCI-X, or PCI express bus, but may be any type of suitable local bus. MBX 510 can be an application specific integrated circuit (ASIC) in an embodiment, but alternatively may be implemented as a chipset or group of components that collectively perform the functions described herein.

Microprocessor 524 can manage data transfers between requesting host computers 104 and storage devices 116, handles errors, performs initialization and diagnostics where needed, and performs volume management for all RAID disk arrays. In some embodiments, microprocessor 524 also performs XOR and other RAID-related operations. Microprocessor 524 may be any sort of microprocessor suitable for use in a RAID controller 108, including but not limited to an X86 compatible processor, Power PC, MIPS, SPARC, ARM, or Alpha. Microprocessor 524 may be a monolithic device contained within a separate integrated circuit, or may be embedded in a chipset or other ASIC in a more integrated fashion. Microprocessor 524 is coupled to MBX 510 by microprocessor bus 512, which is typically a PCI, PCI-X, or PCI express bus, but may be any type of suitable local bus.

Management controller 522 allows system administrators to communicate remotely with RAID controller 108 and initially configure, change configuration, launch diagnostics, obtain debug and error logs, monitor performance, and perform similar configuration or monitoring tasks. Management controller 522 is coupled to microprocessor 524 by management controller I/O bus 526. Management controller I/O bus 526 may be any type of local interconnect such as a serial signal or low speed parallel interface, or a local bus such as PCI. Management controller 522 communicates with remote external computers over management bus 528, which is typically Ethernet or a telephone line to provide long distance remote communications. Although external computers coupled to management bus 528 may be host computers 104, they may also be management computers or client computers where a system administrator may configure and manage RAID controller 108.

Cache memory 514 provides temporary storage of read data, write data, and metadata, and is coupled to MBX 510 by volatile memory bus 516. Cache memory 514 is volatile random access memory (RAM), such as dynamic RAM (DRAM) or double data rate (DDR) RAM, and volatile memory bus 516 is a bus suitable for carrying volatile memory control signals, such as a DRAM or DDR bus. In RAID controllers 108 that provide write-back caching, cache memory 514 is usually supplied with power from a secondary power source, such as a battery which is not shown, to maintain the data in cache memory 514 for a period of time if main power fails.

Non-volatile memory 518 is memory that maintains contents over power cycles, and is used to store error and debug logs. Non-volatile memory 518 is typically a type of memory such as flash, non-volatile static RAM (nvSRAM, or simply SRAM), or magnetic RAM (MRAM). Non-volatile memory 518 is coupled to MBX 510 by non-volatile memory bus 520. Non-volatile memory bus 520 is a suitable simple interface such as an Industry Standard Architecture (ISA) bus or a local bus such as PCI.

Although a specific arrangement of components is depicted for RAID controller 108, it should be understood that many other arrangements are possible and contemplated. Therefore, the embodiment shown should be understood to be only one possible embodiment out of many such embodiments, and the present invention is able to be practiced on other embodiments as well.

Figure 6:
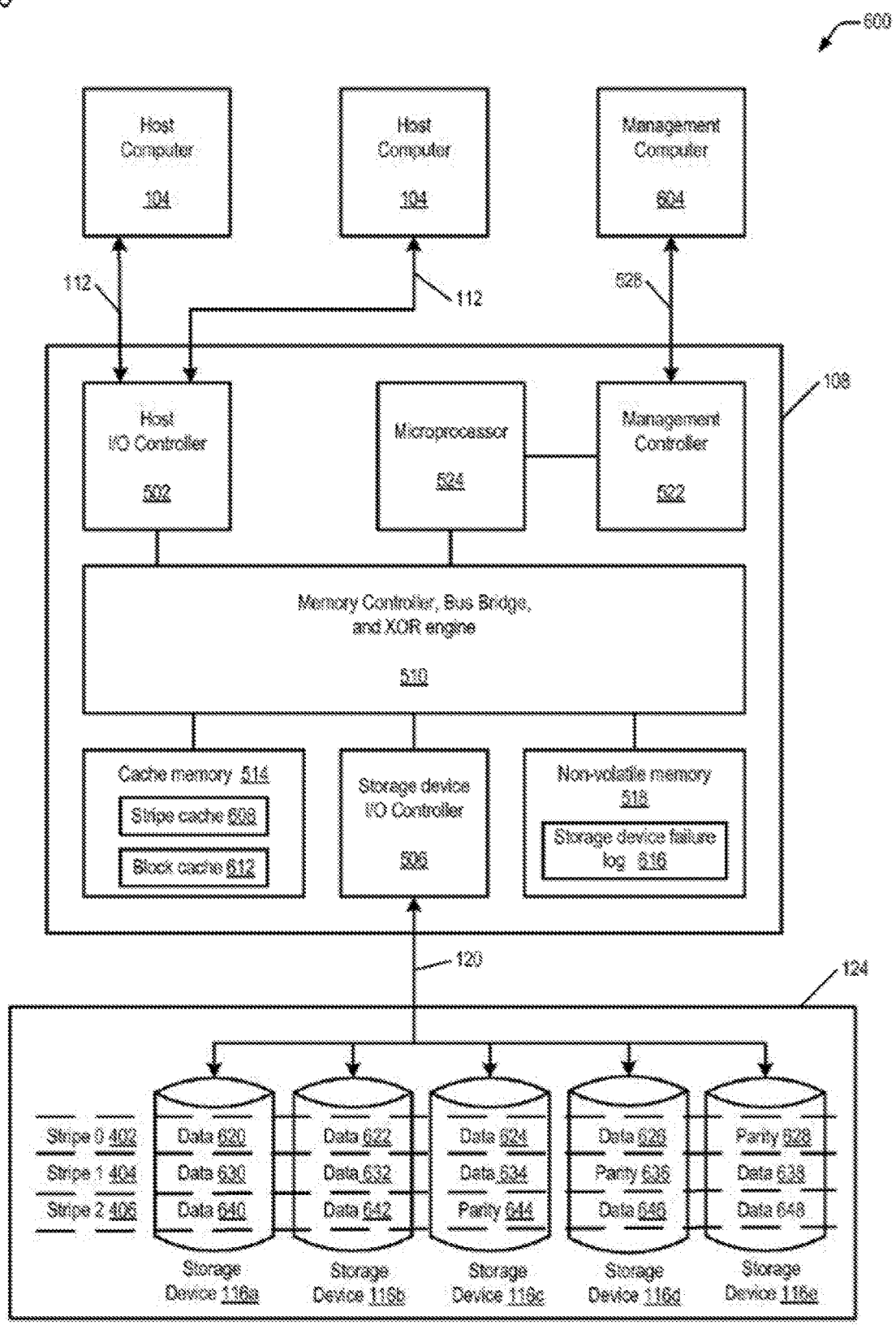
FIG. 6 is a block diagram illustrating RAID system 600, according to various embodiments.

Referring now to FIG. 6, a block diagram illustrating RAID system 600 of the present invention is shown. Host computers 104 send I/O requests to RAID controller 108 across host buses 112. RAID controller 108 sends read and write requests to storage devices 116 in storage subsystem 124 across storage bus 120. In the embodiment shown, five storage devices 116a-116e are configured in a RAID 5 configuration.

Data is stored on storage devices 116 in stripes, with three stripes 402, 404, and 406 shown. In stripe 0 402, blocks 620, 622, 624, and 626 store data and block 628 stores parity. In stripe 1 404, blocks 630, 632, 634, and 638 store data and block 636 stores parity. In stripe 2 406, blocks 640, 642, 646, and 648 store data and block 644 stores parity.

Management computer 604 is coupled to RAID controller 108 by management bus 528. System administrators manage RAID controller 108 and storage subsystem 124 through management computer 604. Management tasks including setup and configuration of RAID controller 108 and storage subsystem 124, and monitoring of event, error, and debug logs in RAID controller 108 may be performed, among other tasks. Specifically, error logs that identify failing storage devices 116 in storage subsystem 124 can be read from a storage device failure log 616 in non-volatile memory 518. This can allow a system administrator to take a specific action to repair or remedy the logged storage devices 116 failure in storage device failure log 616. Such actions include replacing failed storage devices 116, rebuilding data from failed storage devices 116 onto spare storage devices 116, or archiving data from storage devices 116 so that data recovery techniques and software applications can be used to attempt to recover lost data.

Cache memory 514 of RAID controller 108 has a first portion allocated to a stripe cache 608, which stores a stripe 402, 404, 406 of data read from storage devices 116a-116e. Data is read into stripe cache 608 as part of a scrub operation, which will be described with reference to FIGS. 7-9. Cache memory 514 of RAID controller 108 has a second portion allocated to a block cache 612, which stores a block 620-648 read from storage devices 116a-116e. Block cache 612 is used in conjunction with an analyze operation, which will be described with reference to FIGS. 10-12. Storage device failures identified by the analyze operation are stored in storage device failure log 616 of non-volatile memory 518, where they are readable by management computer 604 and can be acted upon by a system administrator.

Although a specific arrangement of components is depicted for RAID system 600, it should be understood that many other arrangements are possible and contemplated. Therefore, the embodiment shown should be understood to be only one possible embodiment out of many such embodiments, and the present invention is able to be practiced on other embodiments as well.

Figure 7:
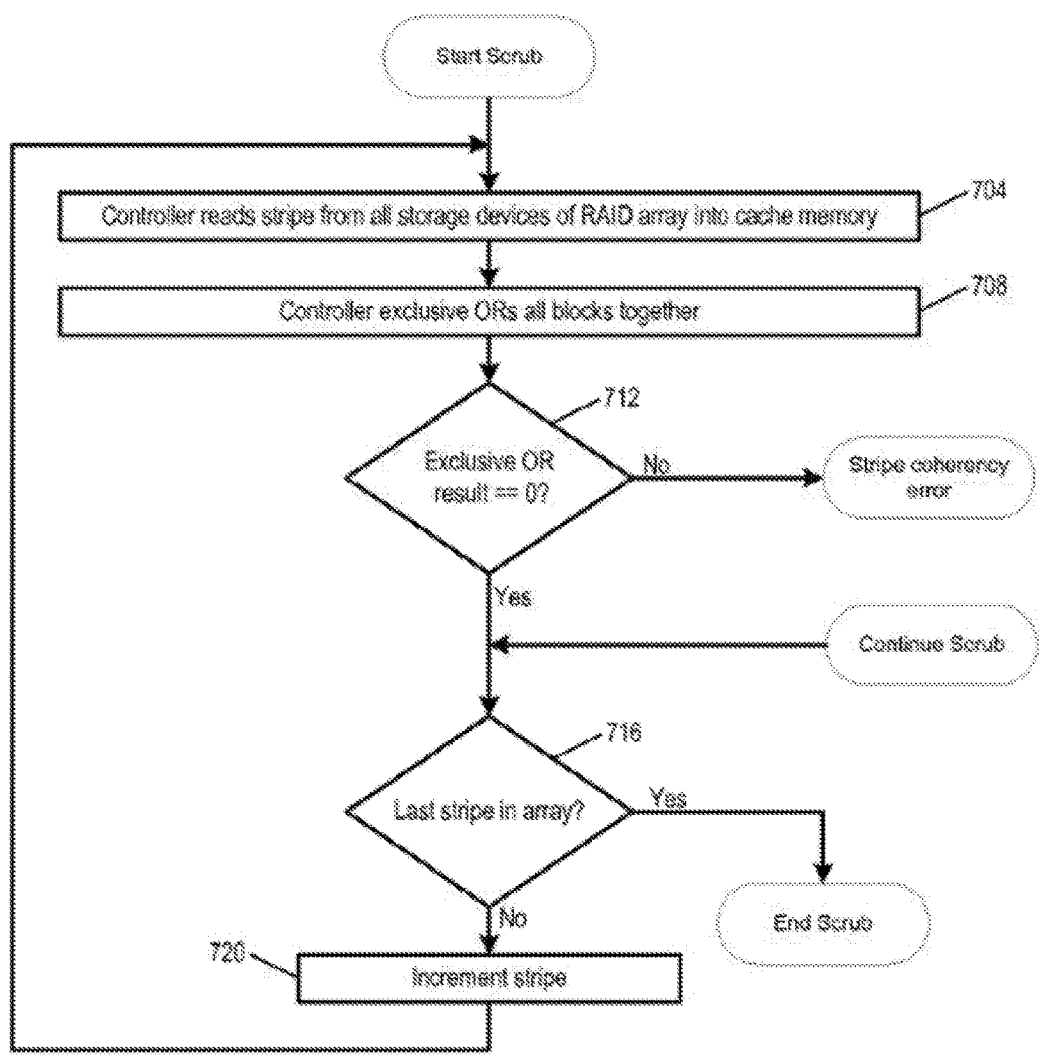
FIG. 7 is a flowchart illustrating an embodiment of a scrub operation, according to various embodiments.

Referring now to FIG. 7, a flowchart illustrating an embodiment of a scrub operation is shown. The description in FIGS. 7-9 assumes the RAID controller has already enabled the scrub operation, with the scrub operation beginning at the first program step in each FIG. 7-9. Flow begins at block 704.

At block 704, RAID controller 108 reads a stripe 402-410 from all storage devices 116 of a RAID array into cache memory 514, such as into stripe cache 608. For a parity-based RAID array, this means reading all data blocks and parity blocks within the same stripe. For a mirror-based RAID array, this means reading the data blocks in the same stripe for each set of storage devices 116 that constitute the mirrored array. Flow proceeds to block 708. At block 708, the RAID controller exclusive ORs (XORs) all blocks read in step 704. Flow proceeds to block 712.

At block 712, the RAID controller evaluates the result of the XOR operation made in block 708. If the result of the XOR operation was equal to zero, then the stripe 402-410 is coherent and flow proceeds to block 716. If the result of the XOR operation was not equal to zero, then the stripe 402-410 is not coherent. Flow can then proceed to one of the analyze phase processes in FIGS. 10-12.

At block 716, a check is made if the current stripe is the last stripe in the RAID array. If the current stripe is the last stripe in the RAID array, then the process ends. If the current stripe is not the last stripe in the RAID array, then flow proceeds to block 720. At block 720, the current stripe is incremented. Flow proceeds back to block 704 to repeat the reading 704, XORing 708, comparing 712, and incrementing 720 steps until all stripes in the RAID array have been scrubbed.

Figure 8:
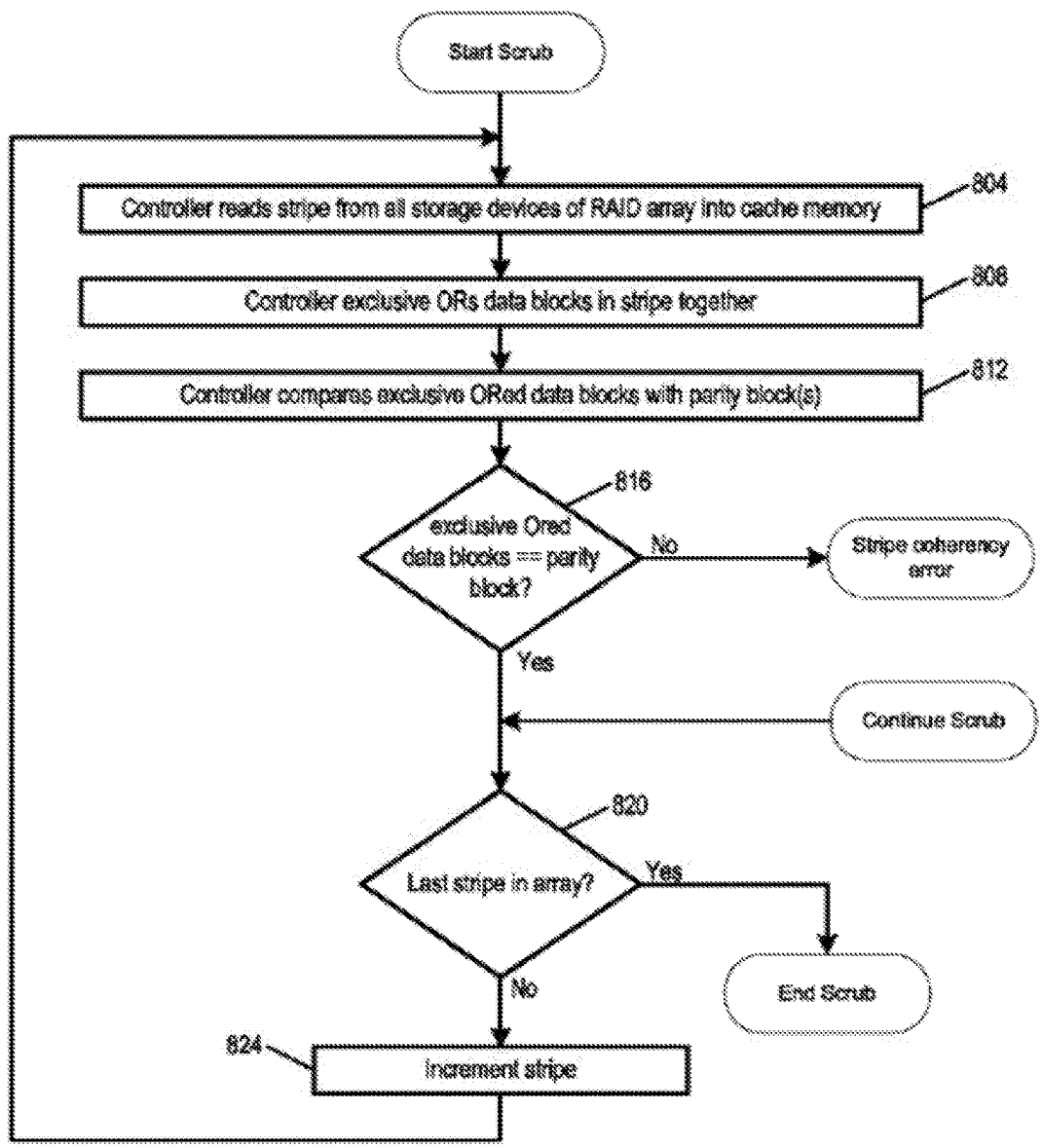
FIG. 8 is a flowchart illustrating an alternate embodiment of a scrub operation for a parity-based RAID array, according to various embodiments.

Referring now to FIG. 8, a flowchart illustrating an alternate embodiment of a scrub operation for a parity-based RAID array is shown. Flow begins at block 804.

At block 804, RAID controller 108 reads a stripe 402-410 from all storage devices 116 of a parity-based RAID array into cache memory 514. For a parity-based RAID array, this means reading all data blocks and parity blocks within the same stripe. Flow proceeds to block 808. At block 808, the RAID controller XORs all data blocks read in step 804, leaving out parity blocks from the XOR operation. Flow proceeds to block 812. At block 812, the RAID controller compares the XORed data blocks from step 808 with the parity block(s) from the same stripe. Flow proceeds to block 816.

At block 816, the RAID controller evaluates the comparison of the exclusive OR of data blocks with the parity block(s) made in block 812. If the XORed data blocks are the same as the parity block(s), then the stripe is coherent and flow proceeds to block 820. If the XORed data blocks are not the same as the parity block(s), then the stripe is not coherent. Flow can then proceed to one of the analyze phase processes in FIGS. 10-12.

At block 820, a check is made if the current stripe is the last stripe in the RAID array. If the current stripe is the last stripe in the RAID array, then the process ends. If the current stripe is not the last stripe in the RAID array, then flow proceeds to block 824. At block 824, the current stripe is incremented. Flow proceeds back to block 804 to repeat the reading 804, XORing 808, comparing 812, and incrementing 824 steps until all stripes in the RAID array have been scrubbed.

Figure 9:
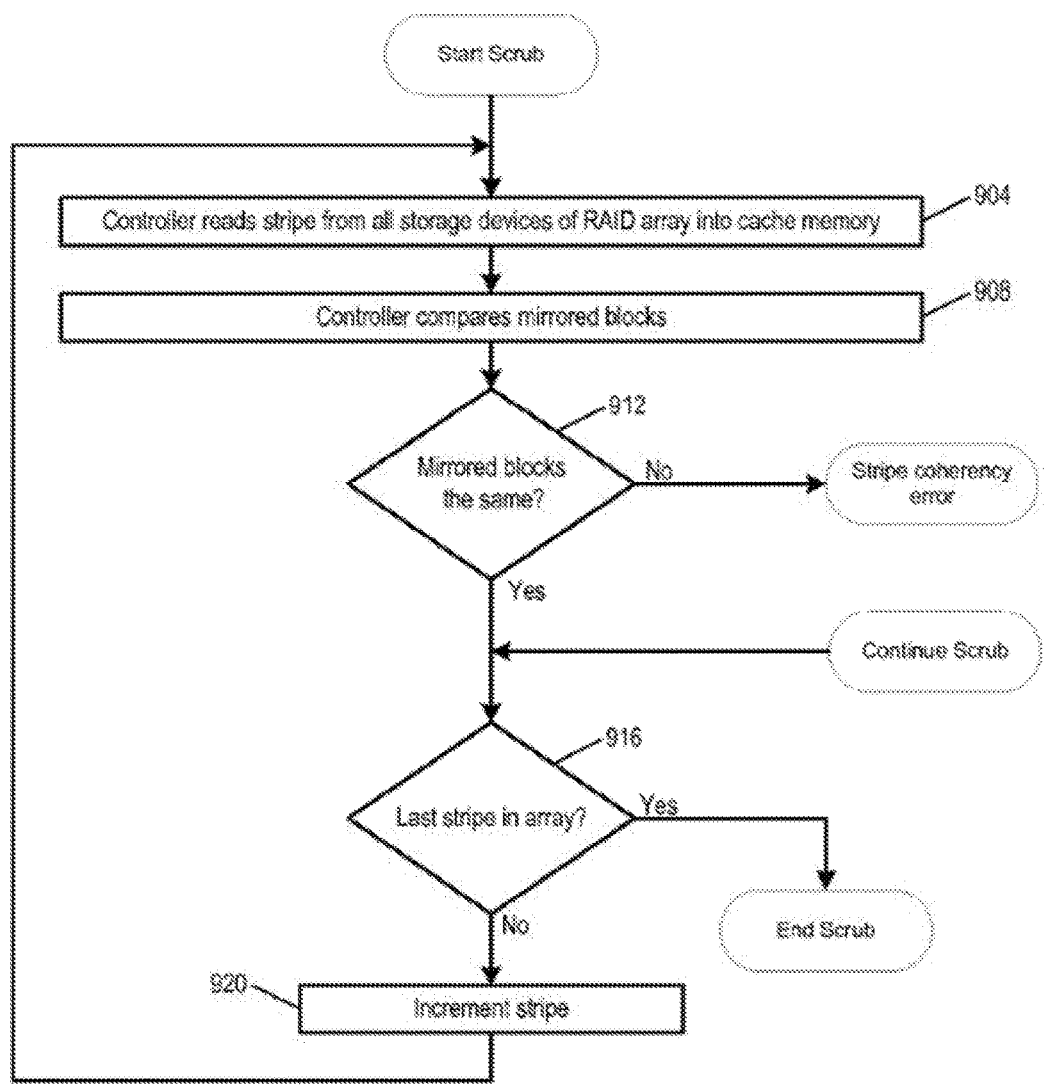
FIG. 9 is a flowchart illustrating an alternate embodiment of a scrub operation for a mirror-based RAID array, according to various embodiments.

Referring now to FIG. 9, a flowchart illustrating an alternate embodiment of a scrub operation for a mirror-based RAID array is shown. Flow begins at block 904.

At block 904, RAID controller 108 reads a stripe 402-410 from all storage devices 116 of a mirror-based RAID array into cache memory 514. For a mirror-based RAID array, this means reading the data blocks in the same stripe for each set of storage devices 116 that constitute the mirrored array. Flow proceeds to block 908. At block 908, the RAID controller compares a pair of mirrored data blocks read in step 904. Flow proceeds to block 912.

At block 912, the RAID controller 108 evaluates the comparison of the mirrored data blocks made in block 908. If the mirrored data blocks are the same, then the stripe is coherent and flow proceeds to block 916. If the mirrored data blocks are not the same, then the stripe is not coherent. Flow can then proceed to one of the analyze phase processes in FIGS. 10-12.

At block 916, a check is made if the current stripe is the last stripe in the RAID array. If the current stripe is the last stripe in the RAID array, then the process ends. If the current stripe is not the last stripe in the RAID array, then flow proceeds to block 920. At block 924, the current stripe is incremented. Flow proceeds back to block 904 to repeat the reading 904, comparing 908, and incrementing 920 steps until all stripes in the RAID array have been scrubbed.

Figure 10:
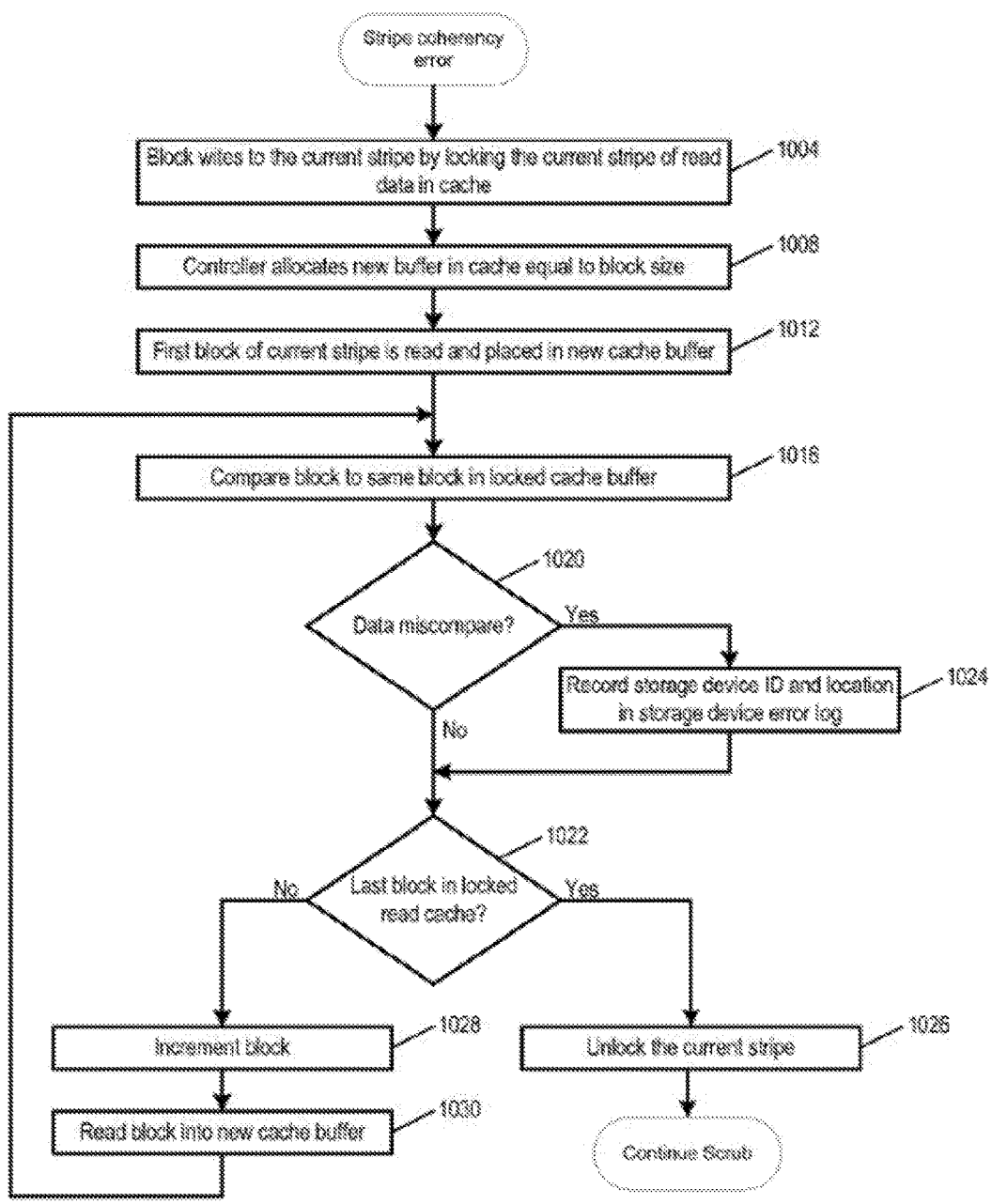
FIG. 10 is a flowchart illustrating an embodiment of an analyze operation for a RAID array following a stripe coherency error, according to various embodiments.

Referring now to FIG. 10, a flowchart illustrating an embodiment of an analyze operation for a RAID array following a stripe coherency error is shown. Flow begins at block 1004.

At block 1004, writes are blocked to the current stripe by locking the current stripe in stripe cache 608, i.e., the RAID controller 108 prevents writes to the current stripe of the redundant array. Recall that data is previously read into the stripe cache 608 in blocks 704, 804, and 904 of FIGS. 7, 8, and 9, respectively. Flow proceeds to block 1008.

At block 1008, the RAID controller allocates a new buffer in cache memory 514 equal to the block size. This new buffer will be the block cache 612 of FIG. 6. The size of block cache 612 will be the size of a block, which is the amount of data on one storage device 116 in one stripe 402-410. Flow proceeds to block 1012. At block 1012, the first block of the data in stripe cache 608 is read again from the same location of the appropriate storage device 116 and placed into block cache 612. Flow proceeds to block 1016.

At block 1016, the block of data in block cache 612 is compared to the corresponding block of data in stripe cache 608, i.e., to the block in the stripe cache 608 read from the same location of storage device 116 at block 1012 (if this is the first time through the loop) or at block 1030 (if this is a subsequent time through the loop). Flow proceeds to block 1020.

At block 1020, if the blocks of data compared in step 1016 are the same, then flow proceeds to block 1022. If the blocks of data compared in step 1016 are different, the data miscompares and flow instead proceeds to block 1024.

At block 1024, the storage device ID and physical location corresponding to the storage device 116 containing the block of data that experienced the miscompare in step 1020 are recorded in storage device failure log 616. In an embodiment, the storage device failure log 616 is stored in non-volatile memory 518. However, it may be stored additionally or in place of non-volatile memory 518 in cache memory 514, in a storage device 116, elsewhere in the RAID controller 108, or in a memory location of a computer containing a RAID software application 208 or failure identification software application 212. Physical location of the storage device 116 is commonly information such as equipment rack number, enclosure number, and slot number within the enclosure. However, it should be understood that physical location is any information that enables service personnel to find and replace the failing storage device 116, and may be different than equipment rack number, enclosure number, or slot number. The storage device ID may be a serial number or other value uniquely identifying the failing storage device 116. Flow proceeds to block 1022.

At block 1022, a check is made to determine if the data block just compared was the last data block in the stripe locked in stripe cache 608. If it was the last data block in stripe cache 608, then flow proceeds to block 1026. If it was not the last data block in stripe cache 608, then flow proceeds to block 1028. At block 1026, the current stripe of data in stripe cache 608 is unlocked, enabling the data in the stripe cache 608 to be overwritten by the RAID controller 108. At this point, the analyze phase completes for the current stripe, and flow proceeds to blocks 716, 820, or 916 of FIG. 7, 8, or 9, respectively, depending on which scrub embodiment was in effect when the analyze phase of FIG. 10 was invoked.

At block 1028, the block number 620-648 is incremented, which will select the next available block 620-648 in the current stripe 402-410. In particular, the next available block 620-648 in the current stripe 402-410 will be on the next storage device 116 in the redundant array. Flow proceeds to block 1030. At block 1030, the new data block 620-648 corresponding to the incremented data block number in step 1028 is read from the appropriate storage device 116 and placed into block cache 612. Flow proceeds back to block 1016 to repeat the steps at blocks 1016 to 1030 until all blocks in the current stripe in stripe cache 608 have been analyzed.

Although some embodiments of the analyze operation read a stripe of data into stripe cache 608, other embodiments are contemplated in which different amounts of data are read into stripe cache 608. Similarly, other embodiments are contemplated in which different amounts of data are read into block cache 612. However, other amounts of data may produce different performance due to lower efficiency in reading, comparing, and logging. This applies equally to FIGS. 10, 11, and 12, herein.

Figure 11:
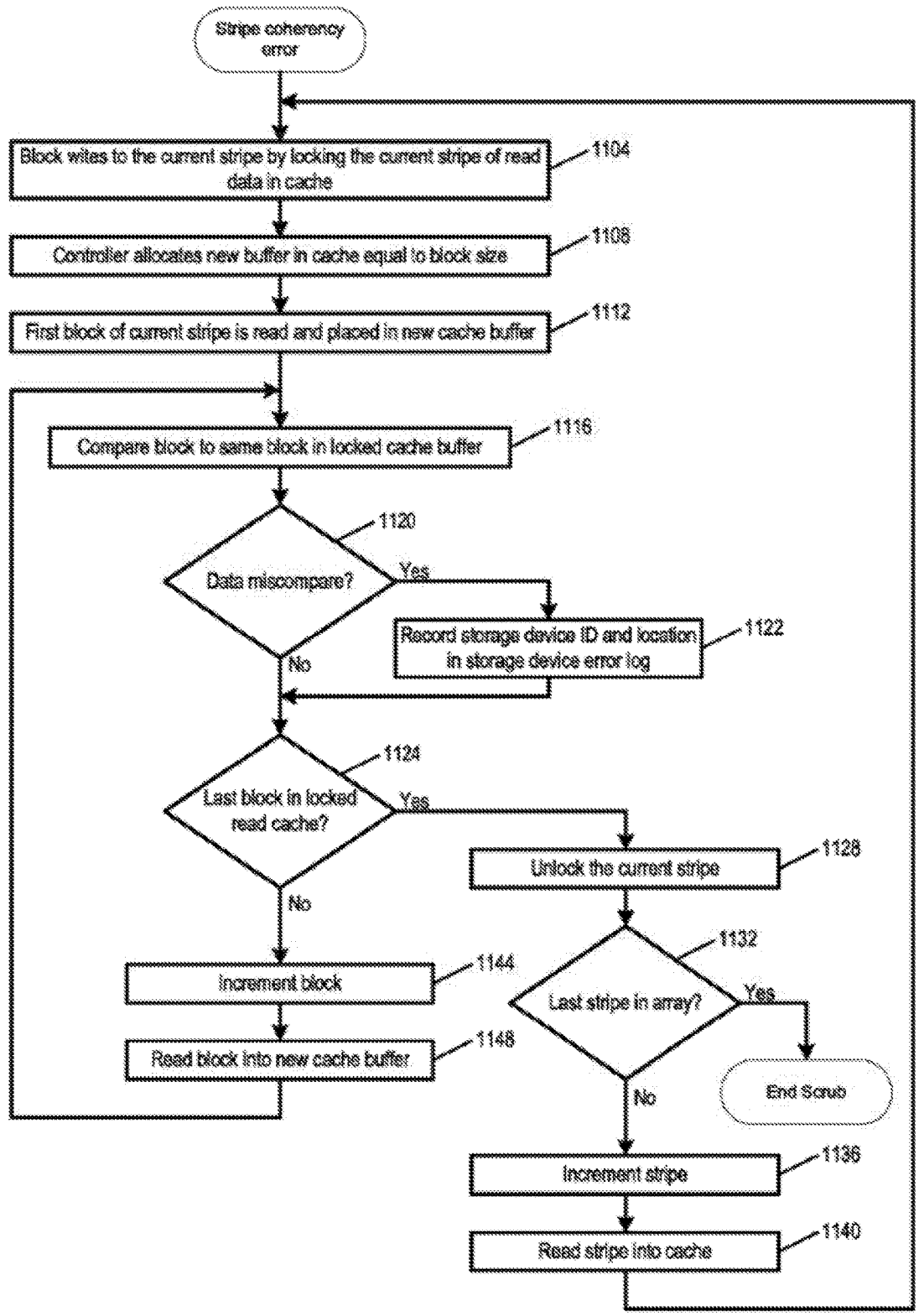
FIG. 11 is a flowchart illustrating a second embodiment of an analyze operation for a RAID array following a stripe coherency error, according to various embodiments.
Figure 12:
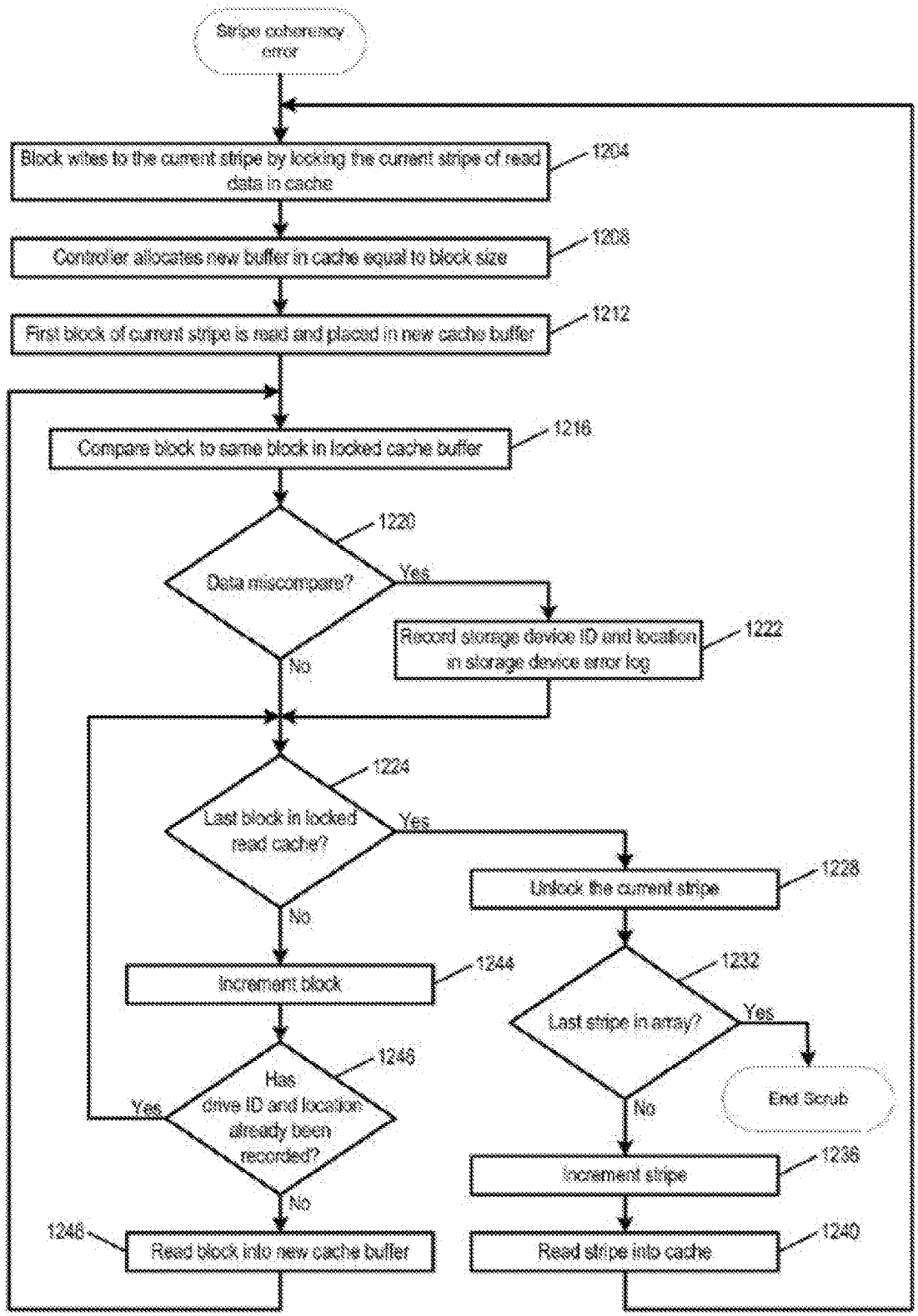
FIG. 12 is a flowchart illustrating a third embodiment of an analyze operation for a RAID array following a stripe coherency error, according to various embodiments.

The embodiments shown in FIGS. 10, 11, and 12 may be further modified to add a counter. If employed, the counter measures occurrences of coherency failures during stripe scrub operations, when there are no failing storage devices 116 identified within the same stripe. This keeps coherency errors from filling up memory space unnecessarily. However, once a first failing storage device 116 is identified, all subsequent coherency failures during stripe scrub operations will be logged in memory, even when there are no failing storage devices 116 identified within the same stripe.

Referring now to FIG. 11, a flowchart illustrating a second embodiment of an analyze operation for a RAID array following a stripe coherency error is shown. Flow begins at block 1104.

At block 1104, writes are blocked to the current stripe by locking the current stripe in stripe cache 608, i.e., the RAID controller 108 prevents writes to the current stripe of the redundant array. Recall that data is previously read into the stripe cache 608 in blocks 704, 804, and 904 of FIGS. 7, 8, and 9, respectively. Additionally, subsequent times through the outer loop of FIG. 11, the data is read into the stripe cache 608 at block 1140, as described below. Flow proceeds to block 1108.

At block 1108, the RAID controller 108 allocates a new buffer in cache memory equal to the block size. This new buffer will be the block cache 612 of FIG. 6. The size of block cache will be the size of a block, which is the amount of data on one storage device 116 in one stripe 402-410. Flow proceeds to block 1112. At block 1112, the first block of the data in stripe cache 608 is read again from the same location of the appropriate storage device 116 and placed into block cache 612. Flow proceeds to block 1116.

At block 1116, the block of data in block cache 612 is compared to the corresponding block of data in stripe cache 608, i.e., to the block in the stripe cache 608 read from the same location of storage device 116 at block 1112 (if this is the first time through the inner loop) or at block 1148 (if this is a subsequent time through the inner loop). Flow proceeds to block 1120. At block 1120, if the blocks of data compared in step 1116 are the same, then flow proceeds to block 1124. If the blocks of data compared in step 1116 are different, the data miscompares and flow instead proceeds to block 1122.

At block 1122, the storage device 116 ID and physical location corresponding to the storage device 116 containing the block of data that experienced the miscompare in step 1120 are recorded in storage device failure log 616. In some embodiments, the storage device failure log 616 is stored in non-volatile memory 518. However, it may be stored additionally or in place of non-volatile memory 518 in cache memory 514, in a storage device 116, elsewhere in the RAID controller 108, or in a memory location of a computer containing a RAID software application 208 or failure identification software application 212. Physical location of the storage device is commonly information such as equipment rack number, enclosure number, and slot number within the enclosure. However, it should be understood that physical location is any information that enables service personnel to find and replace the failing storage device 116, and may be different than equipment rack number, enclosure number, or slot number. The storage device ID may be a serial number or other value uniquely identifying the failing storage device 116. Flow proceeds to block 1124.

At block 1124, a check is made to determine if the data block just compared was the last data block in the stripe locked in stripe cache 608. If it was the last data block in stripe cache 608, then flow proceeds to block 1128. If it was not the last data block in stripe cache 608, then flow proceeds to block 1144. At block 1128, the current stripe of data in stripe cache 608 is unlocked, enabling the data in the stripe cache 608 to be overwritten by the RAID controller 108. Flow proceeds to block 1132.

At block 1132, a check is made to determine if the current stripe is the last stripe in the RAID array. If it is the last stripe in the RAID array, then both the analyze and the scrub phases end immediately. If it is not the last stripe in the RAID array, then flow proceeds to block 1136. At block 1136, the current stripe is incremented in preparation for the next stripe to be read into stripe cache 608. Flow proceeds to block 1140.

At block 1140, a new stripe of data corresponding to the incremented stripe number from block 1136 is read from storage devices 116 into stripe cache 608. Flow proceeds to block 1104, where the steps at blocks 1104 to 1140 are repeated for each of the data blocks in the new stripe in stripe cache 608. At block 1144, the current data block number is incremented in preparation to reading the new data block into block cache 612. In particular, the next available block 620-648 in the current stripe 402-410 will be on the next storage device 116 in the redundant array. Flow proceeds to block 1148.

In block 1148, the data block corresponding to the new block number from block 1144 is read from the appropriate storage device 116 and placed into block cache 612. Flow proceeds to block 1116, where the steps at blocks 1116 to 1148 are repeated until the remaining data blocks of the RAID array have been analyzed.

Once the scrub phase from FIG. 7, 8, or 9 transitions to block 1104 to enter the analyze phase of FIG. 11, control is never returned to the scrub process of FIGS. 7-9. Instead, the remaining data blocks of the RAID array are analyzed and checked for consistency.

Referring now to FIG. 12, a flowchart illustrating a third embodiment of an analyze operation for a RAID array following a stripe coherency error is shown. This embodiment is similar to that shown in FIG. 11, with the exception that this embodiment may not continue to analyze blocks on storage devices 116 that have previously been identified and recorded as failing storage devices 116. Flow begins at block 1204.

At block 1204, writes are blocked to the current stripe by locking the current stripe in stripe cache 608, i.e., the RAID controller 108 prevents writes to the current stripe of the redundant array. Recall that data is previously read into the stripe cache 608 in blocks 704, 804, and 904 of FIGS. 7, 8, and 9, respectively. Additionally, subsequent times through the outer loop of FIG. 12, the data is read into the stripe cache 608 at block 1240, as described below. Flow proceeds to block 1208.

At block 1208, the RAID controller allocates a new buffer in cache memory 514 equal to the block size. This new buffer will be the block cache 612 of FIG. 6. The size of block cache will be the size of a block, which is the amount of data on one storage device 116 in one stripe 402-410. Flow proceeds to block 1212. At block 1212, the first block of the data in stripe cache 608 is read again from the same location of the appropriate storage device 116 and placed into block cache 612. Flow proceeds to block 1216.

At block 1216, the block of data in block cache 612 is compared to the corresponding block of data in stripe cache 608, i.e., to the block in the stripe cache 608 read from the same location of storage device 116 at block 1212 (if this is the first time through the inner loop) or at block 1248 (if this is a subsequent time through the inner loop). Flow proceeds to block 1220. At block 1220, if the blocks of data compared in step 1216 are the same, then flow proceeds to block 1224. If the blocks of data compared in step 1216 are different, the data miscompares and flow instead proceeds to block 1222.

At block 1222, the storage device 116 ID and physical location corresponding to the storage device 116 containing the block of data that experienced the miscompare in step 1220 are recorded in storage device failure log 616. In some embodiments, the storage device failure log 616 is stored in non-volatile memory 518. However, it may be stored additionally or in place of non-volatile memory 518 in cache memory 514, in a storage device 116, elsewhere in the RAID controller 108, or in a memory location of a computer containing a RAID software application 208 or failure identification software application 212. Physical location of the storage device is commonly information such as equipment rack number, enclosure number, and slot number within the enclosure. However, it should be understood that physical location is any information that enables service personnel to find and replace the failing storage device 116, and may be different than equipment rack number, enclosure number, or slot number. The storage device ID may be a serial number or other value uniquely identifying the failing storage device 116. Flow proceeds to block 1224.

At block 1224, a check is made to determine if the data block just compared was the last data block in the stripe locked in stripe cache 608. If it was the last data block in the stripe locked in stripe cache 608, then flow proceeds to block 1228. If it was not the last data block in stripe cache 608, then flow proceeds to block 1244. At block 1228, the current stripe of data in stripe cache 608 is unlocked, enabling the data in the stripe cache 608 to be overwritten by the RAID controller 108. Flow proceeds to block 1232.

At block 1232, a check is made to determine if the current stripe is the last stripe in the RAID array. If it is the last stripe in the RAID array, then both the analyze and the scrub phases end immediately. If it is not the last stripe in the RAID array, then flow proceeds to block 1236. At block 1236, the current stripe is incremented in preparation for the next stripe to be read into stripe cache 608. Flow proceeds to block 1240. At block 1240, a new stripe of data corresponding to the incremented stripe number from block 1236 is read from storage devices 116 into stripe cache 608. Flow proceeds to block 1204, where the steps at blocks 1204 to 1248 are repeated for each of the data blocks in the new stripe in stripe cache 608.

At block 1244, the current data block number is incremented in preparation for checking to see if the data block has already been recorded as failing in storage device failure log 616. In particular, the next available block 620-648 in the current stripe 402-410 will be on the next storage device 116 in the redundant array. Flow proceeds to block 1246. At block 1246, the incremented data block number from block 1244 is checked against storage device 116 ID and location information stored in storage device failure log 616. If there is a match, then the data block number has been previously recorded as a failing storage device 116 and flow proceed to block 1224, bypassing the steps at blocks 1248, 1216, and 1220 since the storage device 116 has previously been identified as failing. If there is not a match, then flow proceeds to block 1248.

At block 1248, the data block corresponding to the new block number from block 1244 is read from the appropriate storage device 116 and placed into block cache 612. Flow proceeds to block 1216, where the steps at blocks 1216 to 1248 are repeated until the remaining data blocks of the RAID array have been analyzed.

Once the scrub phase from FIG. 7, 8, or 9 transitions to block 1204 to enter the analyze phase of FIG. 12, control is never returned to the scrub process of FIGS. 7-9. This is the same as shown in FIG. 11. Instead, the remaining data blocks of the RAID array are analyzed and checked for consistency.

Any of the scrub phases in FIGS. 7-9 may be combined with the any of the analyze phases in FIGS. 10-12, depending on preference and objectives. It should be understood that other combinations not specifically shown here are within the scope of the present invention. Memory organization, RAID controller details, data transfer sizes, system architecture, storage device arrangement, and many other parameters can be modified without deviating from the scope of the invention.

Figure 13:
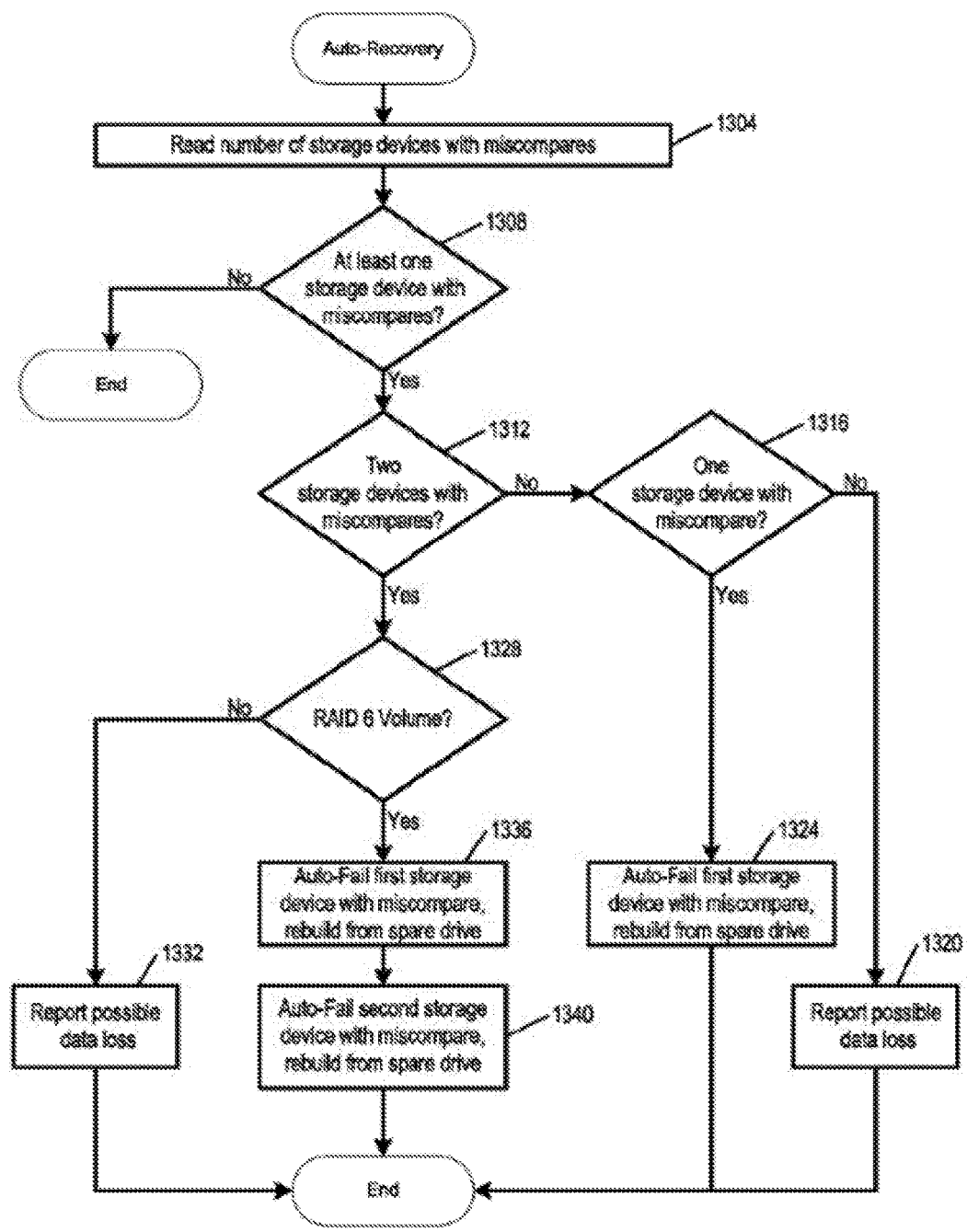
FIG. 13 is a flowchart illustrating an auto-recovery process following the completion of the processes described in FIGS. 7-12, according to various embodiments.

Referring now to FIG. 13, a flowchart illustrating an auto-recovery process following the completion of the processes described in FIGS. 7-12 is shown. Auto-recovery allows the RAID controller 108 to automatically rebuild failed storage devices 116 to available spare storage devices 116, if the number of recorded storage device failures 616 is within the redundancy capability of the RAID level being used. Flow begins at block 1304.

At block 1304, the RAID controller 108 reads the number of storage devices 116 with miscompares from storage device failure log 616 in non-volatile memory 518. Flow proceeds to block 1308. At block 1308, a check is made to see if at least one storage device 116 had a miscompare. If no storage devices 116 have a miscompare, then the process ends since there are no storage devices 116 to rebuild. If at least one storage device 116 has a miscompare, then flow proceeds to block 1312. At block 1312, a check is made to determine if two storage devices 116 have miscompares. If two storage devices 116 have miscompares, then flow proceeds to block 1328. If one storage device 116 has miscompares or more than two storage devices 116 have miscompares, then flow proceeds to block 1316.

At block 1316, a check is made to see if only one storage device 116 had a miscompare. If only one storage device 116 had a miscompare, then flow proceeds to block 1324. If only one storage device 116 did not have a miscompare, this means that more than two storage devices 116 had miscompares, and flow proceeds to block 1320. At block 1320, a message reporting possible data loss is sent by management controller 522 to management computer 604. If more than two storage devices 116 fail, it is beyond the repair capability of conventional RAID levels, and permanent data loss is possible. A system administrator or user needs to determine a best course of action to recover lost data. The process ends after block 1320.

At block 1324, only one storage device 116 has a recorded miscompare. Therefore, for any redundant RAID level, it is possible to recover the data on the failing storage device 116. RAID controller 108 does this by auto-failing the reported storage device 116, and rebuilding data that was on the failed storage device 116 by reading data from the other storage devices 116 of the RAID array, and writing data to an available spare storage device 116. The process ends after block 1324.

At block 1328, the storage device failure log 616 has identified two storage devices 116 with miscompares. A check is made to see if the RAID level of the RAID array containing the storage devices 116 is RAID 6. RAID 6 is the only RAID level of conventional redundant RAID levels that can tolerate up to two storage device 116 failures. If the RAID level of the RAID array is RAID 6, then flow proceeds to block 1336. If the RAID level of the RAID array is other than RAID 6, flow proceeds to block 1332. At block 1332, a message reporting possible data loss is sent by management controller 522 to management computer 604. If two storage devices 116 fail, it is beyond the repair capability of RAID levels other than RAID 6, and permanent data loss is possible. A system administrator or user needs to determine a best course of action to recover lost data. The process ends after block 1332.

At block 1336, two storage devices 116 have recorded miscompares. Since the RAID level of the RAID array recording the miscompares is RAID 6, it is possible to recover the data on the failing storage devices 116. RAID controller 108 does this by auto-failing the first reported storage device 116, and rebuilding data that was on the first failed storage device 116 by reading data from the other storage devices 116 of the RAID 6 array, and writing data to an available spare storage device 116. Flow proceeds to block 1340.

At block 1340, one of two storage devices 116 have been rebuilt to a spare storage device 116. If another spare storage device 116 is available, RAID controller 108 auto-fails the second reported storage device 116, and rebuilds data that was on the second failed storage device 116 by reading data from the other storage devices 116 of the RAID array, and writing data to the available spare storage device 116. The process ends after block 1340.

Figure 14A:
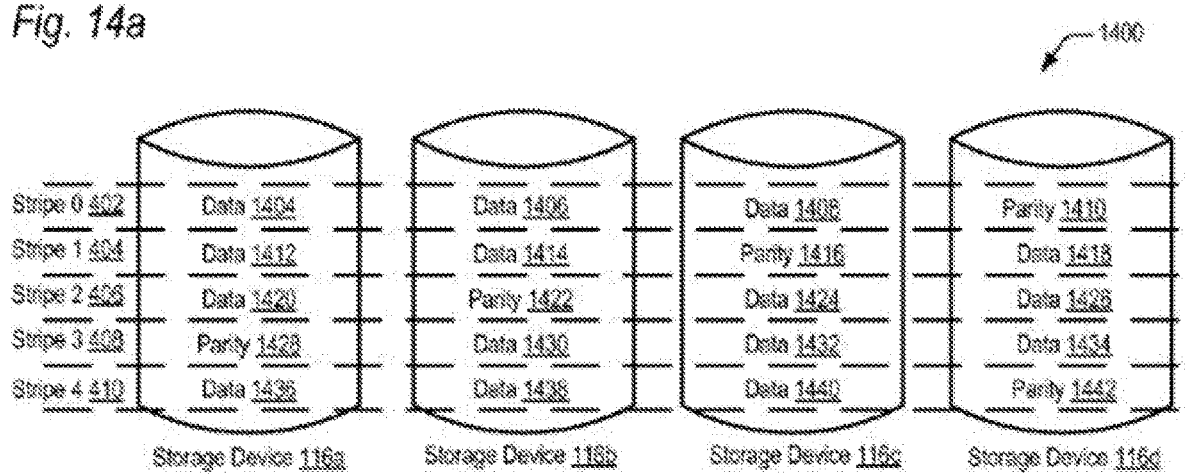
FIG. 14a is a block diagram illustrating the data organization for a RAID 5 array with four storage devices, according to various embodiments.

Referring now to FIG. 14a, a block diagram illustrating the data organization for a RAID 5 array with four storage devices is shown. RAID 5 array 1400 contains four storage devices 116a-116d. All four storage devices 116a-116d are striped, with stripe 0 402 through stripe 4 410 shown. Each stripe is organized into blocks, with three data blocks and one parity block in a RAID 5 array with 4 storage devices 116. Parity blocks 1410, 1416, 1422, 1428, and 1442 are distributed in a rotating fashion per stripe, with all other blocks being data blocks. FIGS. 14b to 14f and 15a to 15b and 16a to 16b illustrate examples of operation of embodiments of the present invention by referring to the redundant array of FIG. 14a.

Figure 14B:
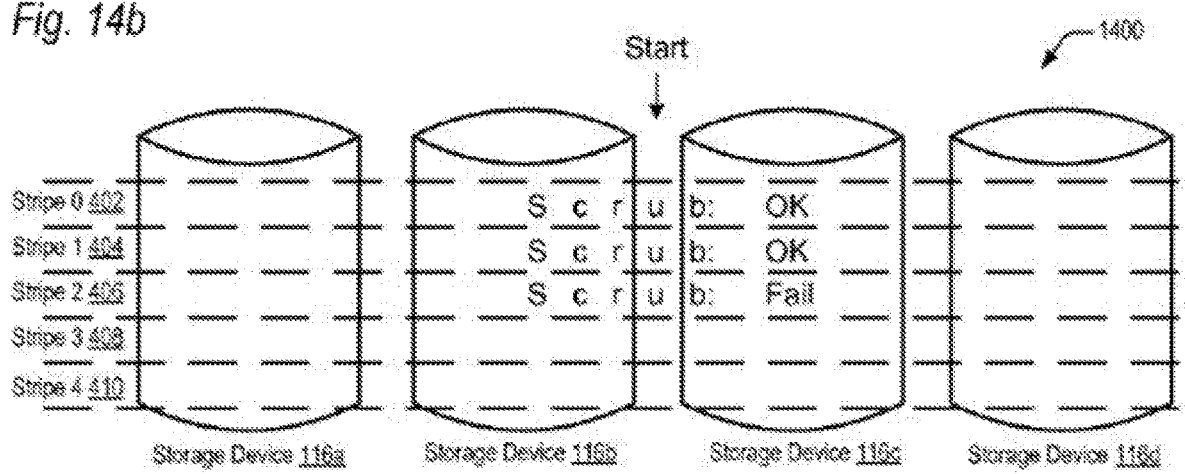
FIG. 14b is a block diagram illustrating the first portion of the scrub process of an embodiment, applied to the RAID 5 array 1400 of FIG. 14a, according to various embodiments.

Referring now to FIG. 14b, a block diagram illustrating the first portion of the scrub process of some embodiments, applied to the RAID 5 array 1400 of FIG. 14a is shown. This diagram assumes that the scrub process is previously enabled. The scrub process starts by reading stripe 0 402 into stripe cache 608 of cache memory 514 of RAID controller 108. RAID controller 108 then XORs blocks 1404, 1406, 1408, and 1410 together. The result of the XOR operation is zero, meaning that stripe 0 402 is coherent and the data read from storage devices 116 is correct. RAID controller 108 then increments the stripe to stripe 1 404, and reads the stripe into stripe cache 608. The scrub process then XORs blocks 1412, 1414, 1416, and 1418 together. Once more, the result of the XOR operation is zero, meaning that stripe 1 404 is coherent and the data read from storage devices 116 is correct. RAID controller 108 then increments the stripe to stripe 2 406, and reads the stripe into stripe cache 608. The scrub process then XORs blocks 1420, 1422, 1424, and 1426 together. This time, the result of the XOR operation is not equal to zero, meaning that stripe 2 406 is not coherent, namely, corrupt data within stripe 2 406 was returned but not reported by any of the storage devices 116 in the redundant array. This can then invoke the analyze process to find a failing storage device 116, as described in FIG. 14c.

Figure 14C:
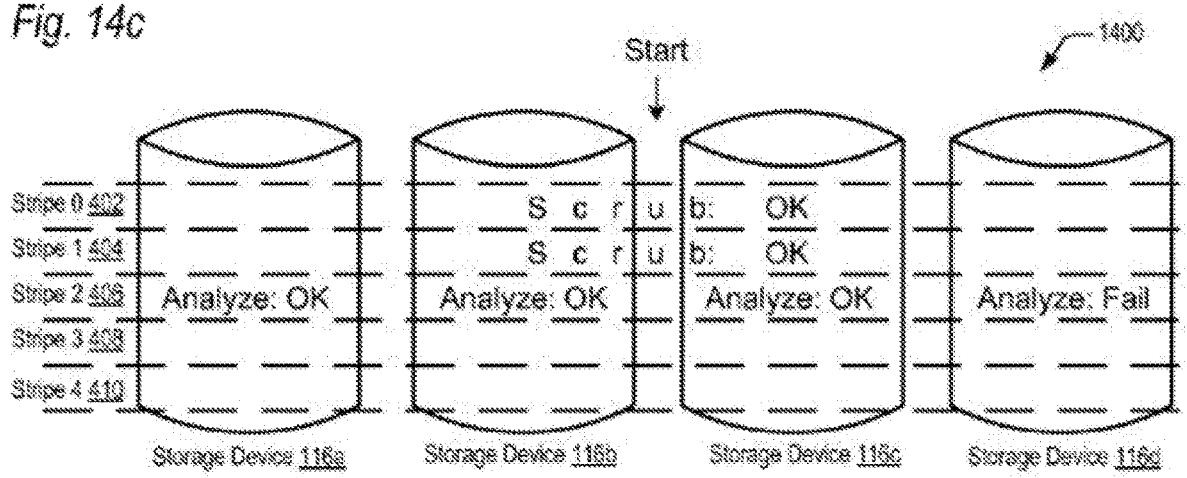
FIG. 14c is a block diagram illustrating the first portion of the analyze process of an embodiment of FIG. 10, applied to the RAID 5 array 1400 of FIG. 14a, according to various embodiments.

Referring now to FIG. 14c, a block diagram illustrating the first portion of the analyze process of some embodiments, applied to the RAID 5 array 1400 of FIG. 14a is shown. Now that an incoherent stripe 2 406 has been identified in FIG. 14b, blocks in stripe 2 406 must be analyzed in order to determine which storage device 116 is producing the bad data. RAID controller 108 first locks stripe cache 608, which prevents writes directed to data within stripe 2 406 from changing the data. Next, RAID controller 108 allocates additional buffer space in cache memory 514 as block cache 612, where the size of the buffer is the same as the block size. The first block of stripe 2 406, block 1420, is read into block cache 612. RAID controller 108 compares block 1420 with the same block 1420 previously read into stripe cache 608. The blocks match, so the analyze process passes for block 1420. The process reads and compares blocks 1422 and 1424 after this, and finds no errors. However, when block 1426 is read and compared with the same block 1426 in stripe cache 608, the data is not identical. This means that storage device 116d is a failing storage device 116 because it returned corrupted data without reporting the corruption, and the ID and location of storage device 116d are recorded in the storage device failure log 616 in non-volatile memory 518. RAID controller 108 next unlocks stripe cache 608 in preparation for scrubbing the next stripe.

Figure 14D:
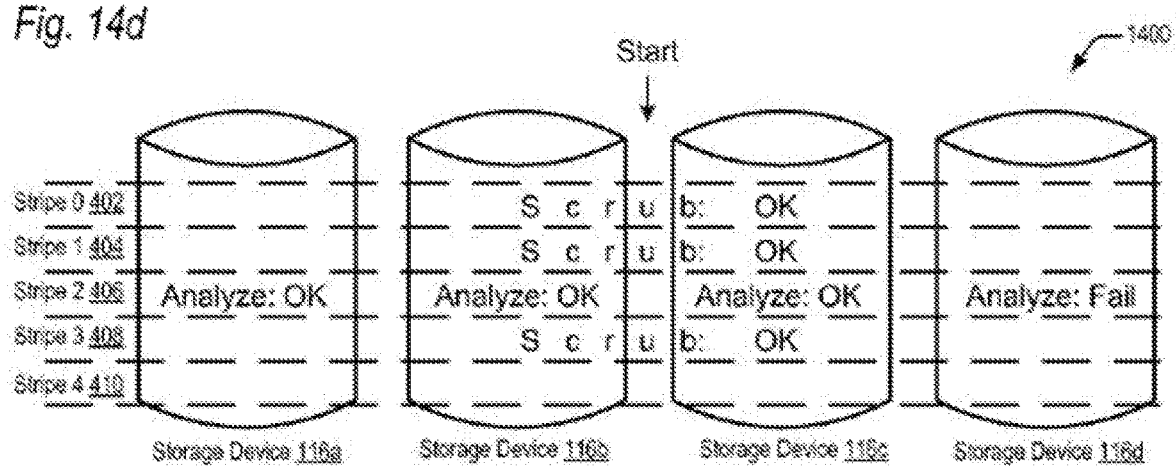
FIG. 14d is a block diagram illustrating the second portion of the scrub process of an embodiment, applied to the RAID 5 array 1400 of FIG. 14a, according to various embodiments.

Referring now to FIG. 14*d*, a block diagram illustrating the second portion of the scrub process of various embodiments, applied to the RAID 5 array 1400 of FIG. 14*a* is shown. Following the identification of failing storage device 116*d* in FIG. 4*c*, the scrub process continues on the next stripe, stripe 3 408. Stripe 3 408 is read into stripe cache 608 of cache memory 514 of RAID controller 108. RAID controller 108 then XORs blocks 1428, 1430, 1432, and 1434 together. The result of the XOR operation is zero, meaning that stripe 3 408 is coherent and the data read from storage devices 116 is correct.

Figure 14E:
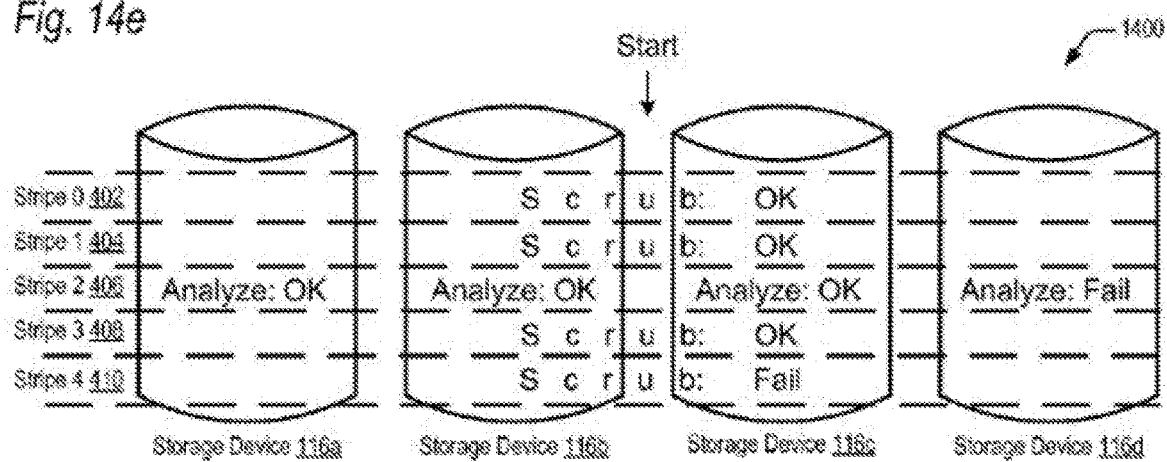
FIG. 14e is a block diagram illustrating the third portion of the scrub process of an embodiment, applied to the RAID 5 array 1400 of FIG. 14a, according to various embodiments.

Referring now to FIG. 14*e*, a block diagram illustrating the third portion of the scrub process of some embodiments, applied to the RAID 5 array 1400 of FIG. 14*a* is shown. Following the scrub process of stripe 3 408 in FIG. 14*d*, RAID controller 108 increments the stripe to stripe 4 410, and reads the stripe into stripe cache 608. The scrub process then XORs blocks 1436, 1438, 1440, and 1442 together. The result of the XOR operation is not equal to zero, meaning that stripe 4 410 is not coherent, namely. In some examples, corrupt data within stripe 4 410 was returned but not reported by any of the storage devices 116 in the redundant array.

Figure 14F:
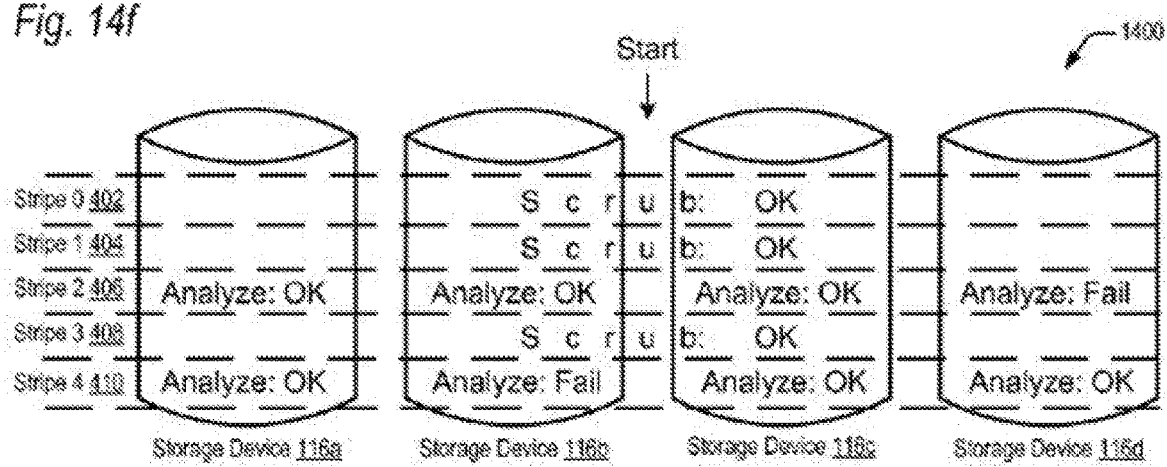
FIG. 14f is a block diagram illustrating the second portion of the analyze process of an embodiment of FIG. 10, applied to the RAID 5 array 1400 of FIG. 14a, according to various embodiments.

Referring now to FIG. 14*f*, a block diagram illustrating the second portion of the analyze process of some embodiments, applied to the RAID 5 array 1400 of FIG. 14*a* is shown. Now that an incoherent stripe 4 410 has been identified in FIG. 14*e*, blocks in stripe 4 410 must be analyzed in order to determine which storage device 116 is producing the bad data. RAID controller 108 first locks stripe cache 608, which prevents writes directed to data within stripe 4 410 from changing the data. Next, RAID controller 108 allocates additional buffer space in cache memory 514 as block cache 612, where the size of the buffer is the same as the block size. The first block of stripe 4 410, block 1436, is read into block cache 612. RAID controller 108 compares block 1436 with the same block previously read into stripe cache 608. The blocks match, so the analyze process passes for block 1436. The process reads and compares block 1438 with the same block in stripe cache 608, and the data is not identical. This means that in some embodiments, the storage device 116*b* is a failing storage device 116 because it returned corrupted data without reporting the corruption, and the ID and location of storage device 116*b* are recorded in the storage device failure log 616 in non-volatile memory 518. The analyze process repeats for blocks 1440 and 1442, and finds no errors. Therefore, at the conclusion of the scrub and analyze phases for RAID 5 array 1400, storage devices 116*b* and 116*d* have been identified as failing storage devices 116, and are logged in storage device failure log 616 accordingly.

Figure 15A:
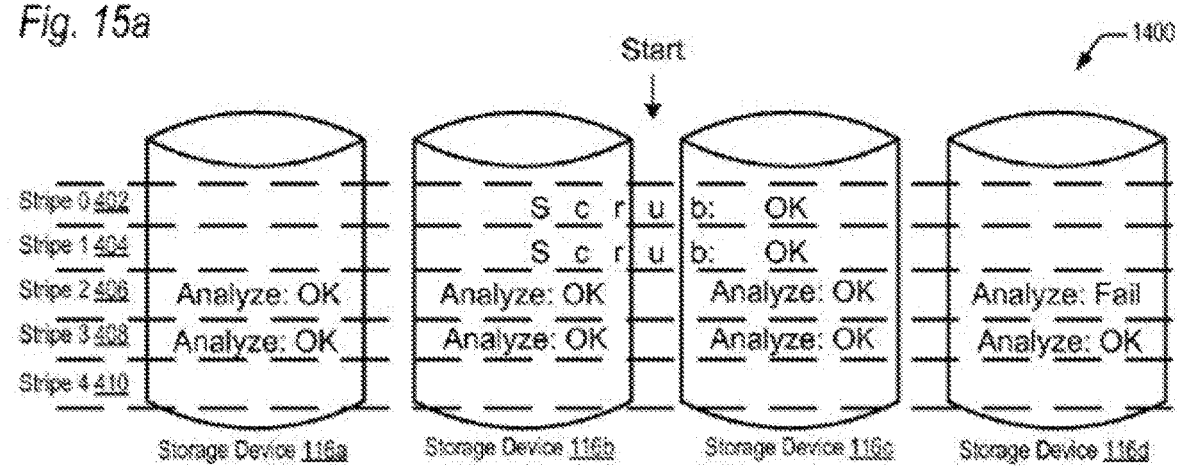
FIG. 15a is a block diagram illustrating the second portion of the analyze process of the alternate embodiment of FIG. 11, applied to the RAID 5 array 1400 of FIG. 14a, according to various embodiments.

Referring now to FIG. 15*a*, a block diagram illustrating the second portion of the analyze process of an alternate embodiment, applied to the RAID 5 array 1400 of FIG. 14*a* is shown. This diagram and the diagram of FIG. 15*b* assumes the RAID 5 array 1400 of FIG. 14*a* is being used to store data and the scrub and analyze processes of FIGS. 14*b* and 14*c* have already occurred. Following the identification of failing storage device 116*d* in FIG. 4*c*, RAID controller 108 remains in the analyze process until the completion of analyzing all remaining blocks in RAID array 1400. The scrub process is not returned to, after a first failing storage device is identified. The current stripe is incremented to the next stripe, stripe 3 408. Stripe 3 408 is read into stripe cache 608 of cache memory 514 of RAID controller 108. RAID controller 108 first locks stripe cache 608, which prevents writes directed to data within stripe 3 408 from changing the data. Next, RAID controller 108 allocates additional buffer space in cache memory 514 as block cache 612, where the size of the buffer is the same as the block size. The first block of stripe 3 408, block 1428, is read into block cache 612. RAID controller 108 compares block 1428 with the same block previously read into stripe cache 608. The blocks match, so the analyze process passes for block 1428. The analyze process repeats for blocks 1430, 1432 and 1434, and finds no errors. RAID controller 108 next unlocks stripe cache 608 in preparation for reading the next stripe.

Figure 15B:
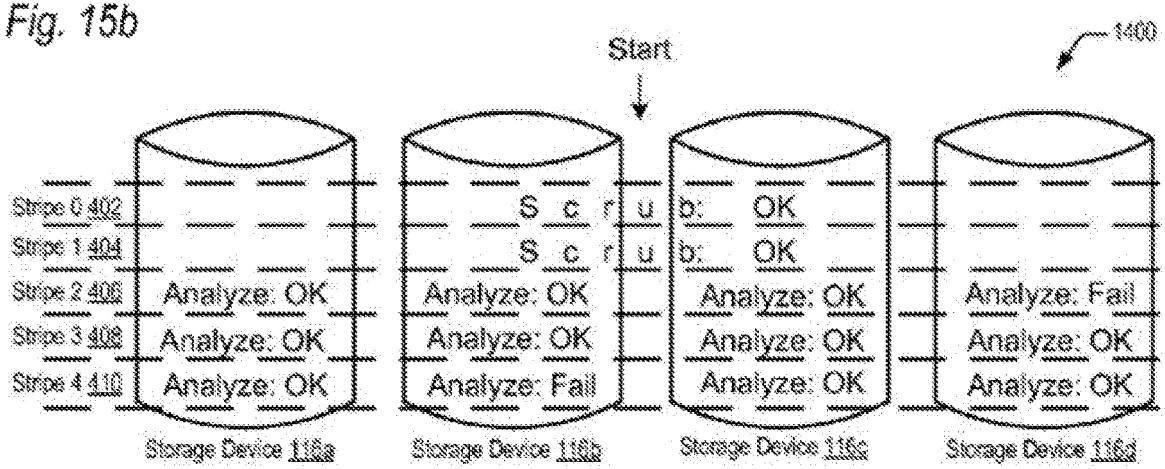
FIG. 15b is a block diagram illustrating the third portion of the analyze process of the alternate embodiment of FIG. 11, applied to the RAID 5 array 1400 of FIG. 14a, according to various embodiments.

Referring now to FIG. 15*b*, a block diagram illustrating the third portion of the analyze process of an alternate embodiment, applied to the RAID 5 array 1400 of FIG. 14*a* is shown. The current stripe is incremented to the next stripe, stripe 4 410. Stripe 4 410 is read into stripe cache 608 of cache memory 514 of RAID controller 108. RAID controller 108 first locks stripe cache 608, which prevents writes directed to data within stripe 4 410 from changing the data. Next, RAID controller 108 allocates additional buffer space in cache memory 514 as block cache 612, where the size of the buffer is the same as the block size. The first block of stripe 4 410, block 1436, is read into block cache 612. RAID controller 108 compares block 1436 with the same block previously read into stripe cache 608. The blocks match, so the analyze process passes for block 1436. The analyze process increments the block number to 1438 and reads block 1438 into block cache 612. RAID controller 108 compares block 1438 with the same block previously read into stripe cache 608. The blocks do not match, so the analyze process identifies storage device 116*b*, containing block 1438, as a failing storage device because it returned corrupted data without reporting the corruption, and records the ID and location of storage device 116*b* in the storage device failure log 616 in non-volatile memory 518. The analyze process repeats for blocks 1440 and 1442 and finds no errors. RAID controller 108 next unlocks stripe cache 608 in preparation for scrubbing the next stripe. Therefore, at the conclusion of the scrub and analyze phases for RAID 5 array 1400, storage devices 116*b* and 116*d* have been identified as failing storage devices 116, and are logged in storage device failure log 616 accordingly.

Figure 16A:
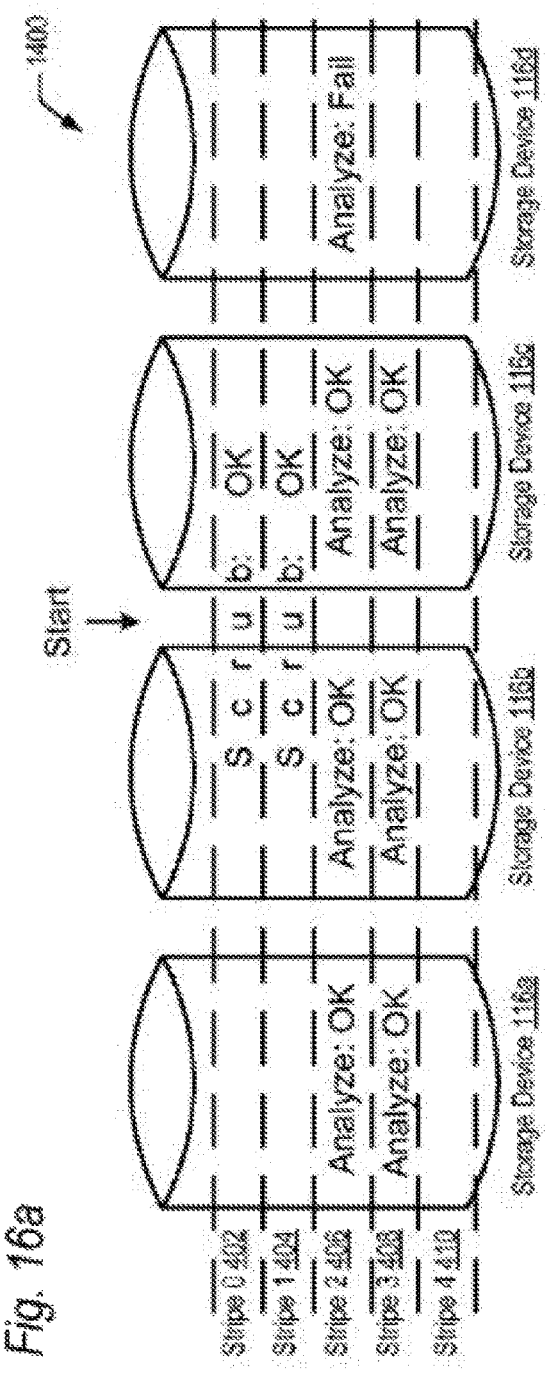
FIG. 16a is a block diagram illustrating the second portion of the analyze process of the alternate embodiment of FIG. 12, applied to the RAID 5 array 1400 of FIG. 14a, according to various embodiments.

Referring now to FIG. 16*a*, a block diagram illustrating the second portion of the analyze process of an alternate embodiment, applied to the RAID 5 array 1400 of FIG. 14*a* is shown. This diagram and the diagram of FIG. 16*b* assumes the RAID 5 array 1400 of FIG. 14*a* is being used to store data and the scrub and analyze processes of FIGS. 14*b* and 14*c* have already occurred. Following the identification of failing storage device 116*d* in FIG. 4*c*, RAID controller 108 remains in the analyze process until the completion of analyzing all remaining blocks in RAID array 1400. The scrub process is not returned to, after a first failing storage device 116 is identified. The current stripe is incremented to the next stripe, stripe 3 408. Stripe 3 408 is read into stripe cache 608 of cache memory 514 of RAID controller 108. RAID controller 108 first locks stripe cache 608, which prevents writes directed to data within stripe 3 408 from changing the data.

Next, RAID controller 108 allocates additional buffer space in cache memory 514 as block cache 612, where the size of the buffer is the same as the block size. The first block of stripe 3 408, block 1428, is read into block cache 612. RAID controller 108 compares block 1428 with the same block previously read into stripe cache 608. The blocks match, so the analyze process passes for block 1428. The analyze process repeats for blocks 1430 and 1432, and finds no errors. The analyze process for block 1434 is skipped, since the storage device 116 containing block 1434, storage device 116d, has already been identified as a failing storage device 116. RAID controller 108 next unlocks stripe cache 608 in preparation for reading the next stripe.

Figure 16B:
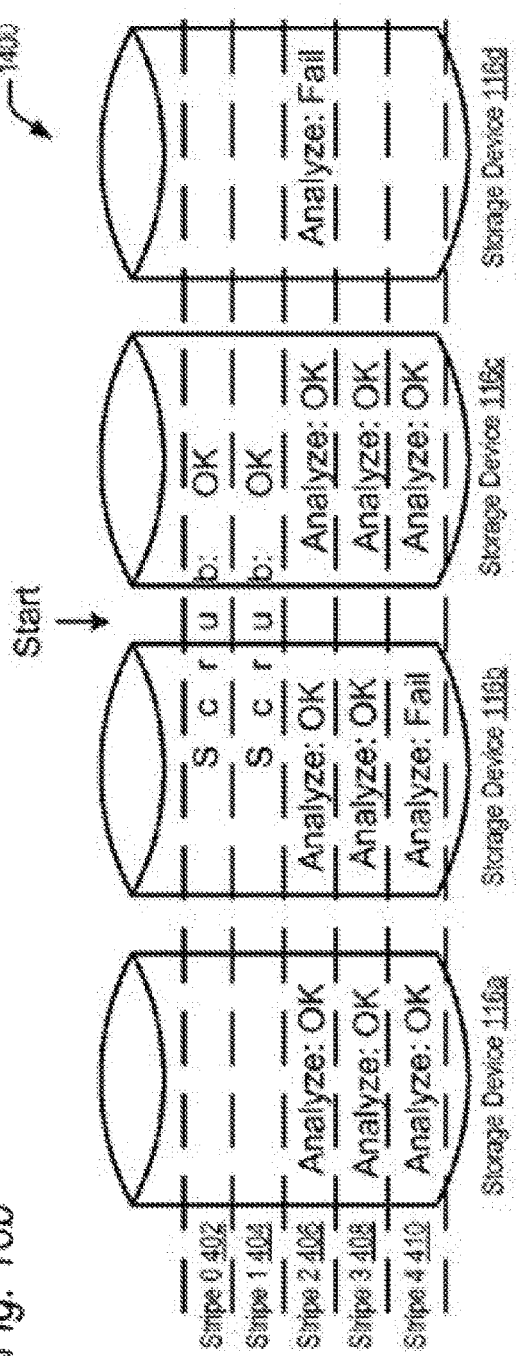
FIG. 16b is a block diagram illustrating the third portion of the analyze process of the alternate embodiment of FIG. 12, applied to the RAID 5 array 1400 of FIG. 14a, according to various embodiments.

Referring now to FIG. 16b, a block diagram illustrating the third portion of the analyze process of an alternate embodiment, applied to the RAID 5 array 1400 of FIG. 14a is shown. The current stripe is incremented to the next stripe, stripe 4 410. Stripe 4 410 is read into stripe cache 608 of cache memory 514 of RAID controller 108. RAID controller 108 first locks stripe cache 608, which prevents writes directed to data within stripe 4 410 from changing the data. Next, RAID controller 108 allocates additional buffer space in cache memory 514 as block cache 612, where the size of the buffer is the same as the block size. The first block of stripe 4 410, block 1436, is read into block cache 612. RAID controller 108 compares block 1436 with the same block previously read into stripe cache 608. The blocks match, so the analyze process passes for block 1436. The analyze process increments the block number to 1438 and reads block 1438 into block cache 612. RAID controller 108 compares block 1438 with the same block previously read into stripe cache 608. The blocks do not match, so the analyze process identifies storage device 116b, containing block 1438, as a failing storage device 116 because it returned corrupted data without reporting the corruption, and records the ID and location of storage device 116b in the storage device failure log 616 in non-volatile memory 518. The analyze process repeats for block 1440 and finds no errors. Analyze is skipped for block 1442 since the storage device 116 containing block 1434, storage device 116d, has already been identified as a failing storage device 116. RAID controller 108 next unlocks stripe cache 608 in preparation for reading the next stripe. Note that in any stripes read after stripe 4 410, blocks on storage devices 116b and 116d will be skipped, since both storage devices 116 are identified as failing storage devices 116. At the conclusion of the scrub and analyze phases for RAID 5 array 1400, storage devices 116b and 116d have been identified as failing storage devices 116, and are logged in storage device failure log 616 accordingly.

Figure 17:
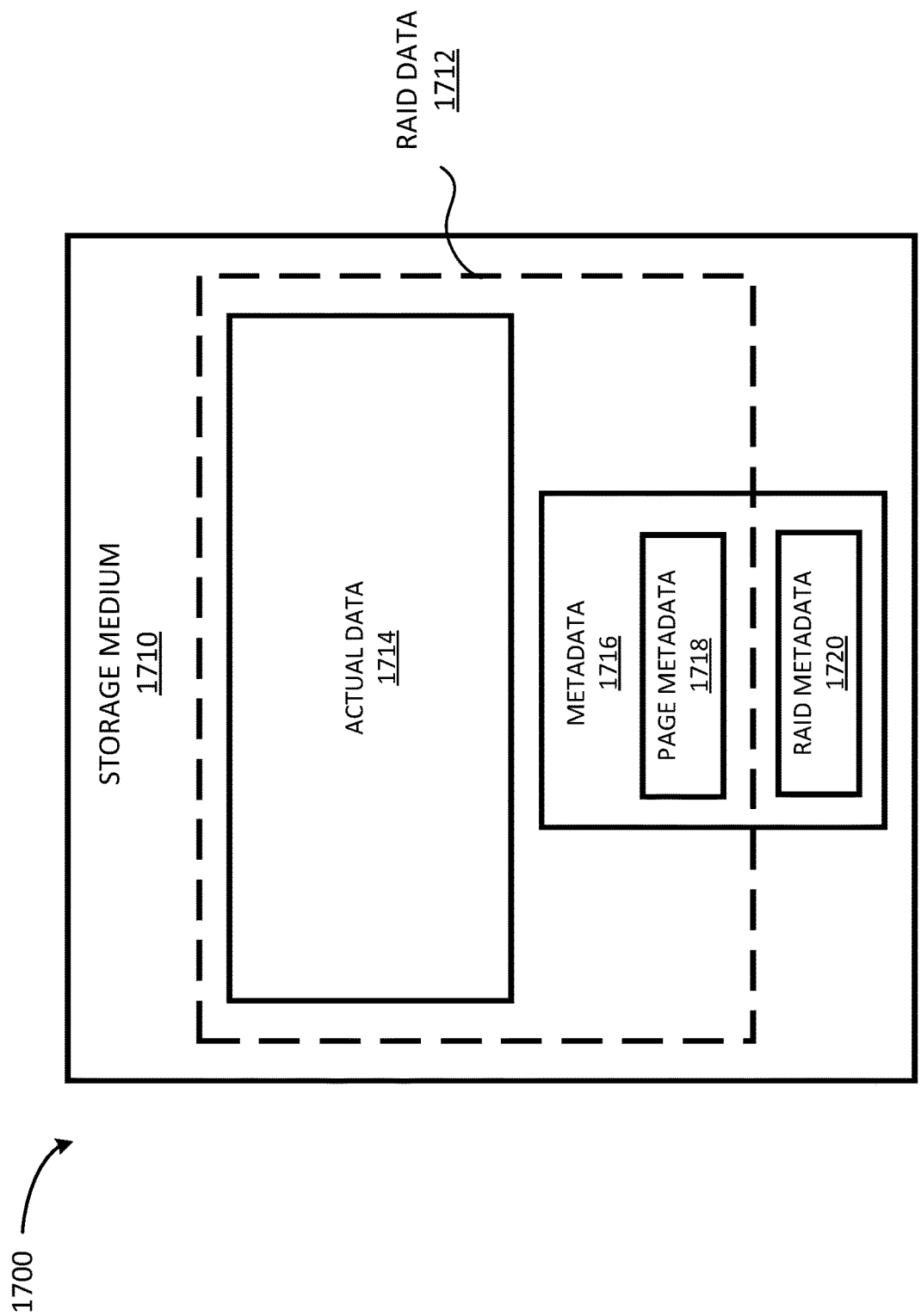
FIG. 17 is a schematic illustration of a system that includes a storage medium, according to various embodiments.

FIG. 17 is a schematic illustration of a system 1700 that includes a storage medium 1710, according to various embodiments.

Embodiments of the present disclosure can include methods and systems that can operate as a mechanism to recover data blocks (e.g., page metadata) if one or more copy of the same data block is present in another resource within a storage medium, such as an in-memory page table (e.g., a bottom level page table) resource.

In storage systems and memory, page storage can be built on top of a RAID level, such as a linear RAID level. In some examples, metadata of page storage is actual data for a corresponding linear RAID level. As described herein, a scrub operation can be performed to a storage medium, such as storage medium 1710. When a scrub operation of linear RAID finds unrecoverable medium error on a metadata region 1716 of page storage, a corrupted block can be identified and marked as a bad or a failed block by a storage controller. This identified failed block can then lead to a logical unit or virtual disk, such as a page storage pool, going offline or otherwise becoming temporarily unusable due to a data integrity problem. Furthermore, in page storage, metadata like a bottom-level page table (BLPT) can be temporarily maintained as objects in a central processing unit (CPU) memory (e.g., an onboard CPU cache). Therefore, when a storage system encounters an unrecoverable error (e.g., of the failed block) on block of page storage metadata, a storage controller can utilize a RAID layer to share the corrupted block number (e.g., via logical block addressing [LBA]) to a corresponding page storage layer. The page storage layer can then convert the block number to a metadata ID of BLPT and search the BLPT object to find any object with calculated metadata ID is present in the BLPT objects, thus correcting the error at the bad block.

An example process according to various embodiments can include various steps. For an example, a first step can include running a scrub operation, which finds a medium error in page metadata. Next, an LBA or LBA range of the medium error can be converted into a BLPT ID. Typically, every page metadata block/LBA has an ID, either appended or derivable therefrom. Next, a storage controller can scan through all in-memory BLPT using the previously-calculated ID. If a match of the calculated ID of page metadata is found, including a BLPT in-memory or within an accessible storage medium such as 1710, then the storage controller can operate to copy the BLPT from the location of the match (e.g., within CPU memory or elsewhere within a storage system) to cache memory. The matched block or BLPT can then be flushed or destaged to disk, such as a backing store. After the data block has been copied and repaired, a second scrub operation can be run, e.g., on the same stripe to verify that medium error has been corrected.

According to various embodiments of the present disclosure, data, such as cache block can be stored on a storage medium. As shown, a storage medium 1710 can be any of various physical or virtual memory or electronic storage mediums. Physical storage mediums can include SSD, HDD, DRAM, SRAM, cache memory, flash memory, non-volatile memory, volatile memory, and the like. Virtual storage mediums can be logical units, such as logical unit numbers (LUNs), virtual disks (VDs), and the like. In some embodiments, storage medium 1710 can represent a virtual storage medium that is stored on one or more physical storage mediums, such as in various RAID schemes, as described herein.

Within example storage medium 1710 can be subsets of data, such as actual data 1714, and metadata 1716. Metadata itself can include page metadata 1718 and/or RAID metadata 1720. According to some embodiments that utilize RAID-based schemes, actual data 1714, and the page metadata portion 1718 of metadata 1716 can compose RAID data 1712, which can be used in conjunction with RAID metadata. Storage medium 1710 (and/or physical disks 1820A-C of FIG. 18) can be in communication with, and can be controlled by one or more storage controller, such as storage controller 1810 as shown and described with respect to FIG. 18.

Figure 18:
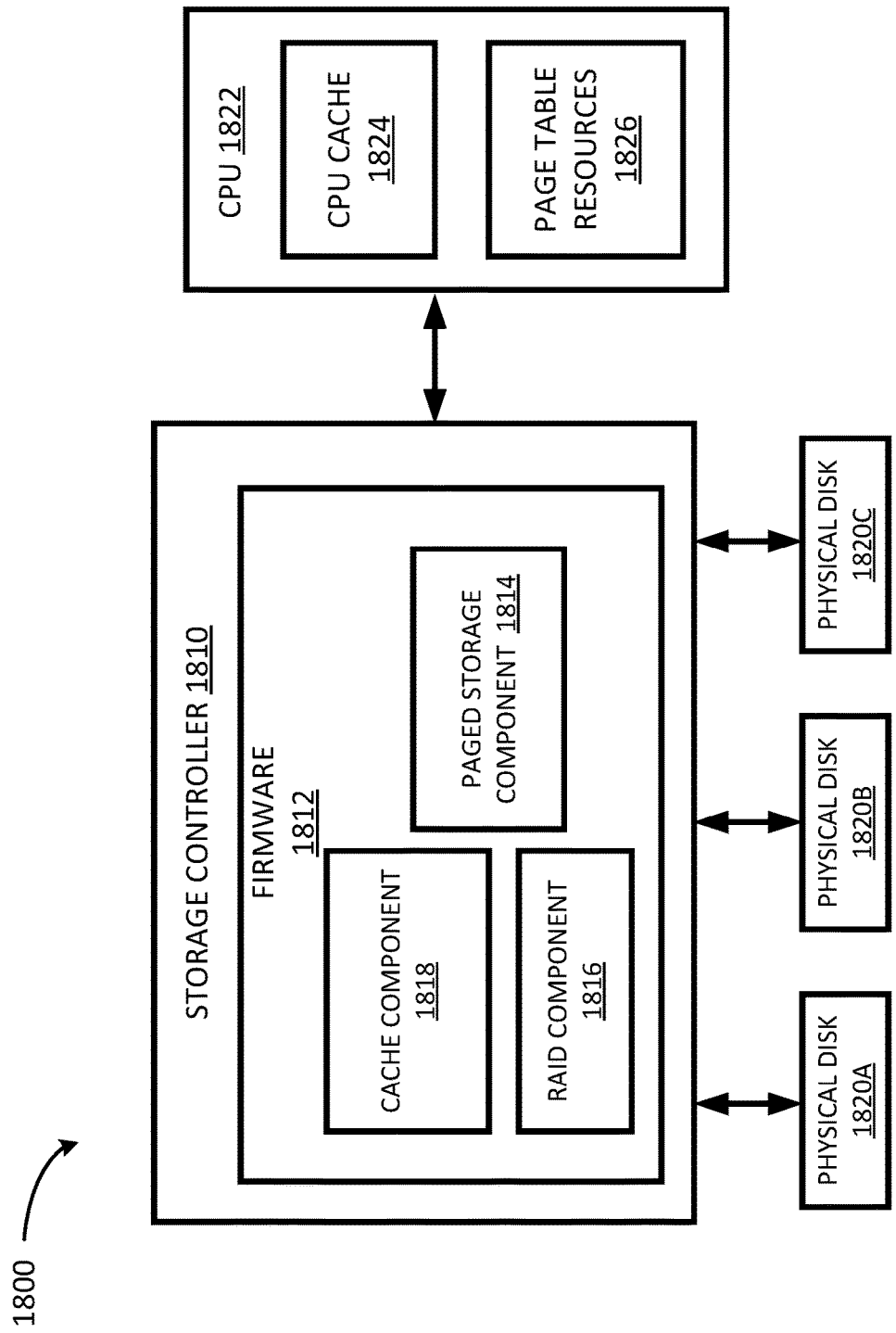
FIG. 18 is a schematic diagram of a storage system, including various constituent components, according to various embodiments.

FIG. 18 is a schematic diagram of a storage system 1800, including various constituent components, according to various embodiments.

According to various embodiments, logical volume mapping of metadata can be used to correct media errors, such as in background scrubbing operations. In external RAID controllers (such as the Seagate Real Store storage array of the present applicant) is for a RAID component of firmware to perform background scrubbing operations to detect media/storage errors. Once detected the RAID component of the RAID controller can use various RAID level encoding and/or parity schemes to reconstruct data that is no longer accessible. However, other media errors, such as a second error, that occur within the same stripe can prevent RAID from successfully reconstructing the lost or bad data.

Further, certain types of data errors, such as dropped writes or firmware defects, do not return an error or the entire stripe was written incorrectly or the update lost (due to firmware defects). In this case, the scrub cannot detect the errors such that a read of a data block. To address these and other problems data, metadata, or other copies of user data that maintained by the controller can be used to detect and/or restore lost data due to media or firmware errors. Several embodiments containing variations are presented herein.

Embodiments can be implemented in storage controller firmware or in any RAID-based array adapter or system that also has a layer above it maintaining data or metadata (e.g., a logical volume mapping layer) or user data (e.g., a cache). Embodiments are implemented using additional communication between various software, logical, and/or hardware layers. As shown, a storage controller 1810 can include various firmware components, such as a cache component 1818, a paged storage component 1814 (which can be or include a logical volume mapping layer), and a RAID component 1816. The storage controller can be operatively connected to one or more physical disks 1820A-C, and/or a CPU 1822, among other components that are omitted for brevity and clarity.

In various embodiments, the RAID component 1816 can operate to provide, manage, and/or create large (or small) RAID arrays out of the physical disks 1820A-C below it in a hierarchy and can make these physical disks 1820A-C available to inputs and outputs from, e.g., the paged storage component 1814. With respect to the paged storage component 1814, given one or more RAID arrays provided according to various RAID schemes can form a pool of RAID arrays and can map logical volumes that are available to inputs and/or outputs from the cache component 1818. With reference to the cache component, a user input/output request can be directed to the cache component 1818, which can maintain copies of user data in a non-volatile manner in order to improve performance, and the cache component 1818 can also control any issuing the input/output to paged storage component 1814 to read or determine if there is no copy. In other embodiments, when a request to free up room in the cache is received, the cache component 1818 can issue a signal to the paged storage components 1814 to clear cache space as needed.

A storage controller 1810, as shown, can be in communication with (as shown) and/or can optionally comprise CPU 1822. The storage controller 1810, as shown, includes firmware 1812. Firmware 1812 itself includes a paged storage component 1814, a RAID component, and a cache component. The paged storage component 1814 can include page metadata, the RAID component 1816 can include RAID metadata, and the cache components 1818 can include actual data, as shown.

The CPU 1822 can itself include a CPU cache 1824, and page table resources 1816. The CPU cache 1824 can include CPU cache data, and the page table resources 1816 can include various page tables and/or page table entries, such as bottom-level page tables (BLPTs). The storage controller 1810, as shown, can be in communication with one or more physical disks 1820A-C. The physical disks 1820A-C can in some embodiments be similar to storage medium 1710 of FIG. 17.

According to one variation of the present disclosure, an existing RAID scrub operation can be modified according to various embodiments. An existing RAID layer via the RAID component 186 may be able to detect, but unable to correct an error. The RAID component 1816 can then communicate with the paged storage component 1814 to determine if the in-memory copies of metadata it maintains (e.g., BLPT and/or NV_REF) belong in that region. If so the RAID component 1816 can have the paged storage component 1814 write those out to the RAID layer, which can use in-memory copies of the metadata to correct and store the data for the portions lost, failed, or bad. This can provide additional recovery capability because the paged storage component 1814 may store its relevant metadata with multiple copies. Therefore, the paged storage component 1814 may be able to retrieve a relevant metadata copy even though one or more particular area(s) in question are bad. In some embodiments, the paged storage component could operate to ask the cache component 181 if it has valid data for the affected (e.g. LBA) range and ask it to mark the range as "dirty," thereby causing the range to be destaged back out through the paged storage component 1814 to the RAID array through the RAID component 1816 to help correct the data error, as appropriate.

According to another variation, for a paged storage-based metadata scrub, a single RAID array is a paged storage pool. According to this embodiment, a new targeted paged storage metadata scrub can be implemented and controlled by the paged storage component 1814, in order to efficiently scrub only the metadata it uses and/or addresses. In particular, this embodiment can be performed if only one RAID array is provided to paged storage via the RAID component 1816 and/or the paged storage component 1814.

According to the above variation, the paged storage-based metadata scrub operation can avoid large user data areas, and can read only metadata. If desired, the scrub operation can be set to only read areas that have been used, e.g., at all or recently. In some embodiments, full stripe reads from paged storage can be used, and in some cases forced full stripe reads from paged storage metadata areas can be used. By forcing full-stripe metadata reads, the RAID component 1816 can be configured to check for media errors and/or parity checks after reading the written data. If the RAID component 1816 is unable to make the correction then it can attempt to recover the data by examining its in-memory structures and writing them back out, as in the other variation, above.

In some embodiments, a sanity check can be implemented. For example, if the RAID component 1816 detects no problems, various methods can be implemented to further check a cyclic redundancy check (CRC) and/or internal contents of the metadata for consistency in order to expand detection. Furthermore, in some cases an enhanced sanity check can be implemented. For example, if the RAID component 1816 detects no problems and there are no CRC or internal inconsistencies, various embodiments can also optionally compare the results to in-memory metadata for what should be stored on an associated disk. If it is incorrect, a problem can be flagged. This operation can provide increased or improved detection that can catch firmware bugs or other problems after the metadata was initially written. Various sanity checks described herein can provide greater debug capability leading to increased firmware quality.

According to yet another variation, a paged storage-based metadata scrub can be implemented across two or more RAID array in a paged storage pool. When more than one RAID array is provided to paged storage via the paged storage component 1814, the paged storage component 1814 can keep copies of all paged storage metadata on each separate RAID array. Therefore, multiple copies of the metadata can be used to add further detection recovery capability. Therefore, according to this variation, extra detection and recovery would be added to the variation with a single RAID array. With respect to extra detection, all copies of metadata from different raid arrays can be compared and flagged as appropriate. With respect to extra recovery, in a case where three or more components (e.g., copies of metadata) are present and two or more agree then it can determine what the correct values are for all three. However, this in some embodiments could be modified to only use CRC-valid copies and timestamps can be further checked for what is the latest copy to detect what is the true latest copy. In various embodiments where a system has crashed during updates of the multiple copies, other embodiments can utilize a separate scrub and repair mechanism than is described herein.

Figure 19A:
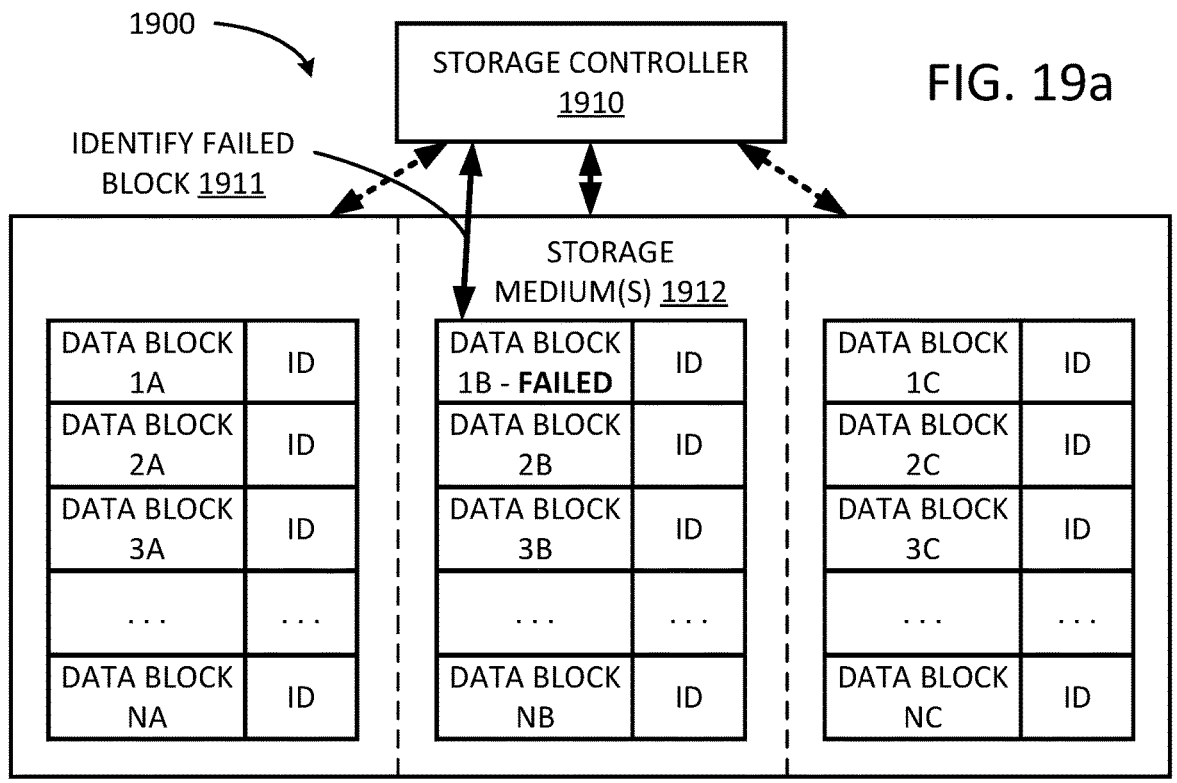
FIG. 19a illustrates a first step at a diagram of a system, where a failed data block is identified, according to various embodiments.
Figure 19B:
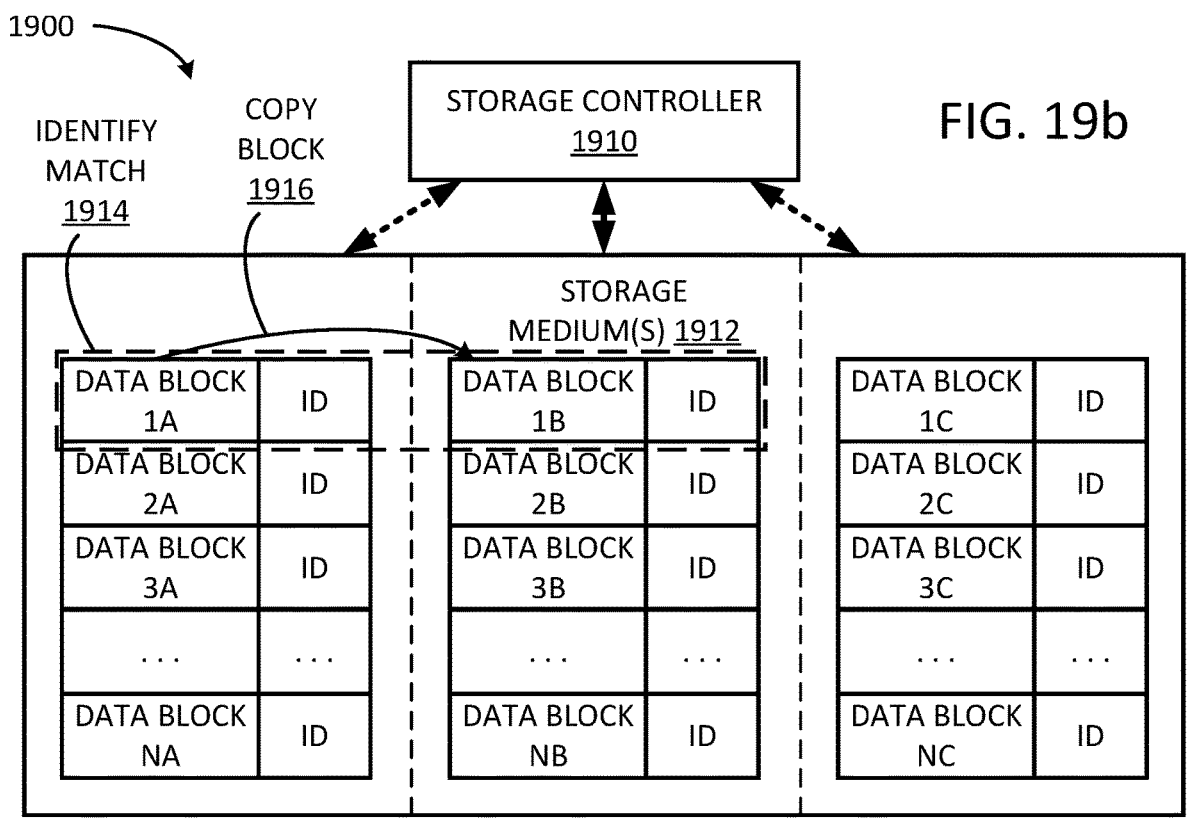
FIG. 19b illustrates a second step at a diagram of a system, where a failed data block is replaced, according to various embodiments.

FIGS. 19a and 19b visually illustrate various steps in carrying out embodiments of the present invention on one or more storage medium(s).

FIG. 19a illustrates a first step at a diagram of a system 1900, where a failed data block is identified at 1911, according to various embodiments.

System 1900 includes a storage controller 1910, which can be similar to storage controller 1810 of FIG. 18. System 1900 also includes one or more storage medium(s) 1912, each of which include one or more data blocks that each have an associated data block ID. In various embodiments, the data blocks are metadata blocks. As shown, a first group of data blocks includes blocks labeled 1A, 2A, 3A, . . . NA, a second group of data blocks includes blocks labeled 1B, 2B, 3B, . . . NB, and a third group of data blocks includes blocks 1C, 2C, 3C, . . . NC. Each of the shown data blocks has an ID associated therewith. In various embodiments, the ID of each data block can be derived from data within the same data block. In other embodiments, the ID associated with a single data block can be appended or concatenated to the data block itself. Various data block IDs can be different, and in various embodiments two data blocks with the same ID can include similar or identical data. Two data blocks that include identical data can be older or new versions of the same data block, or can the instances of the same data block that are stored in various computing components at a particular point in time, such as in a CPU cache and a system memory at the same time.

As shown with respect to FIG. 19a, it is indicated that an example data block 1B has failed within storage medium(s) 1912. The indication that the data block 1B has failed can be received from various components such as the storage controller 1910, for example, during a background scrub operation of the various data blocks. Alternatively, other components of system 1900 or others can be utilized to identify and communicate that a data block, such as block 1B, has failed.

Now with reference to FIG. 19b, a process can proceed following data block 1B having been found to have failed at FIG. 19a. Further operations can be carried out, e.g., by storage controller 1910, in order to replace block 1B such that the data block has been repaired and/or replaced with non-failed data during a RAID scrub operation.

In response to the indication that data block 1B has failed, the ID of data block 1B can be received and used to find a matching, e.g., identical, ID of another data block stored within the storage medium(s) 1912. As shown, a data block 1A is found to have a matching ID as data block 1B at 1914. Once the match is identified at 1914, the data within data block 1A can be copied to data block 1B, replacing the data of data block 1B with the data found at data block 1A. In so doing the failed data block 1B can be repaired, and a signal of the repair can be received or sent via storage controller 1910.

Figure 20:
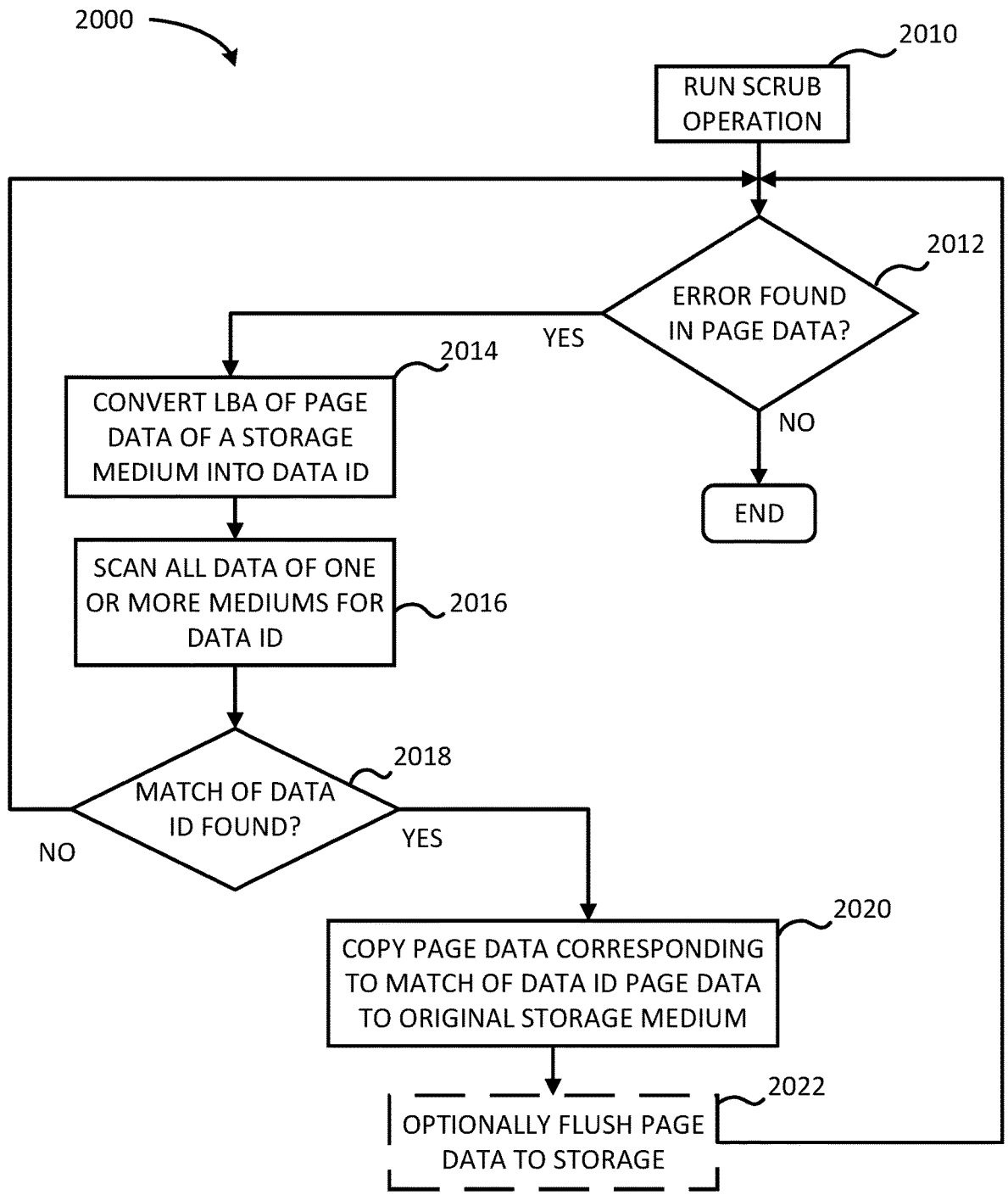
FIG. 20 is a flowchart of a process for managing memory, according to various embodiments.

FIG. 20 is a flowchart of a process 2000 for managing memory, according to various embodiments.

Process 200 can begin by running a scrub operation at operation 2010. The scrub operation can be a background process, which can be used to identify and correct data errors within one or more storage medium. Following operation 2010, the process can proceed to operation 2012 where it can be determined whether an error has been found or detected in page data, such as a data block of paged memory data. If at operation 2012 it is determined that an error is not found in page data, the process can end.

If at operation 2012, it is determined that an error is found in page data, the process can proceed to operation 2014. At operation 2014, one or more logical blocks (e.g., LBAs), or data related thereto, can be converted into a data ID for one or more of the logical blocks and the process can proceed to operation 2016. At operation 2016, all data of one or more storage medium(s) can be scanned for data IDs, such as the data ID corresponding to the error found in page data at operation 2012. The process can then continue to operation 2018.

At operation 2018, it can be determined if a match of the data ID is found in the one or more mediums at operation 2016. If operation 2018 is answered in the negative, the process can repeat operation 2012. If a match of the data ID is found, the process can proceed to operation 2020. At operation 2020, page (e.g., data block) data corresponding to the match of the data ID page data can be copied to the original storage medium where the error was found in page data at operation 2012. Optionally, following operation 2020, the page data copied at operation 2020 can be flushed to disk or other storage medium and the process can end or repeat operation 2012.

Figure 21:
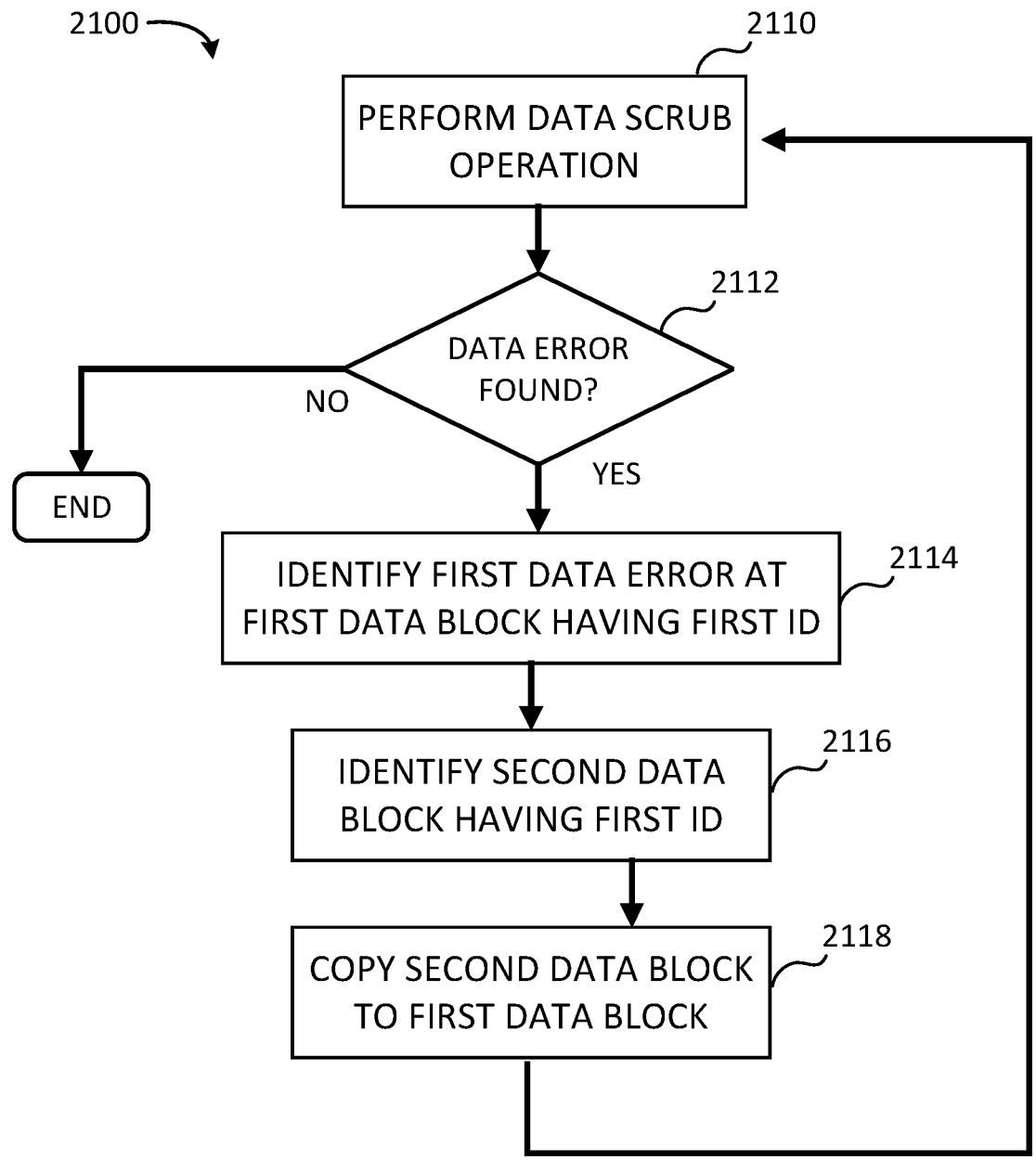
FIG. 21 is a flowchart of another process for managing memory, according to various embodiments.

FIG. 21 is a flowchart of another process 2100 for managing memory, according to various embodiments.

Process 2100 can begin by performing a data scrub operation at operation 2110, for example, but a storage controller, as described herein in various embodiments. Following operation 2110, the process can proceed to operation 2112 where it can be determined by the storage controller whether a data error is found. If a data error is not found at operation 2112, the process may end. If a data error, however, is found at operation 2112, the process can proceed to operation 2114. At operation 2114, a first data error a first data block can be identified, where the first data block has a first data block ID. In some embodiments the identifying the first data error includes scanning the first bottom level page table for the first block logical ID. In various embodiments, the identifying the first data error occurs during a first memory scrubbing operation. The first block logical ID can correspond to a first bottom level page table entry of a first bottom level page table.

Following operation 2114, the process can proceed to operation 2116, where a second data block having the same first data block ID can be identified. In some embodiments the second data block can correspond to a second bottom level page table entry. Following operation 2116, the process can proceed to operation 2118, where the second data block can be copied to the first data block, thereby repairing the data error found at the first data block at operation 2112. The process may then repeat and return the operation 2110 or may end. Alternatively, the process can include a second memory scrubbing operation, where the second memory scrubbing operation determines that the first data error has been corrected. In some embodiments the first data block is stored in a first logical volume, and the second data block is stored in a second logical volume. In various embodiments, the second data block does not experience a second data error concurrently with the first data error at the first data block. In yet further embodiments, the first block logical ID is derived from data stored at the first data block.

A system or controller apparatus that includes a hardware processor operatively coupled to a storage device can also be used to implement variations of the process 2100. The hardware processor can be configured to execute instructions, including instruction for a process for managing data, including the process 2100.

The present invention has now been described with reference to several embodiments thereof. The detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of correcting data errors, comprising:
identifying, using a controller, a first data error at a first data block stored in page metadata of a first storage medium, the first data block having a first block logical ID, the first data block having a first logical block address of the first storage medium, and the first data block corresponding to a first page table entry of the first storage medium;
identifying, using the controller, a second data block of the first storage medium having a second logical block address and having the first block logical ID; and
copying, using the controller, the second data block to the first data block based on the identified second data block.

2. The method of claim 1, wherein the first page table entry is a first bottom level page table entry of a first bottom level page table.

3. The method of claim 2, wherein the identifying the first data error comprises scanning the first bottom level page table for the first block logical ID.

4. The method of claim 2, wherein the second data block corresponds to a second bottom level page table entry of the first bottom level page table.

5. The method of claim 1, wherein the identifying the first data error occurs during a first memory scrubbing operation.

6. The method of claim 5, further comprising a second memory scrubbing operation, wherein the second memory scrubbing operation determines that the first data error has been corrected.

7. The method of claim 1, wherein the first data block is stored in a first logical volume, and the second data block is stored in a second logical volume.

8. The method of claim 1, wherein the second data block does not experience a second data error concurrently with the first data error at the first data block.

9. The method of claim 1, wherein the first block logical ID is derived from data stored at the first data block.

10. The method of claim 1, wherein the first data block is stored on a stripe.

11. The method of claim 10, wherein the stripe comprises a total of 128 data blocks including the first data block, and wherein each data block of the 128 data blocks comprises 512 bytes.

12. A system, comprising:
a hardware processor operatively coupled to a storage device;
the hardware processor configured to execute instructions, including instructions for a process for managing data, the process comprising:
identifying a first data error at a first data block stored in page metadata of a first storage medium, the first data block having a first block logical ID, the first data block having a first logical block address of the first storage medium, and the first data block corresponding to a first page table entry of the first storage medium;
identifying a second data block of the first storage medium having a second logical block address and having the first block logical ID; and
copying the second data block to the first data block based on the identified second data block.

13. The system of claim 12, wherein the first page table entry is a first bottom level page table entry of a first bottom level page table, and wherein the second data block corresponds to a second bottom level page table entry of the first bottom level page table.

14. The system of claim 13, wherein the identifying the first data error comprises scanning the first bottom level page table for the first block logical ID.

15. The system of claim 12, wherein the first data block is stored in a first logical volume, and the second data block is stored in a second logical volume.

16. The system of claim 12, wherein the first block logical ID is derived from data stored at the first data block.

17. A controller apparatus, comprising:
a hardware processor operatively coupled to a management controller, a storage device input/output controller, and a memory device;
the hardware processor configured to execute instructions, including instructions for a process for managing data, the process comprising:
identifying a first data error at a first data block stored in page metadata of a first storage medium, the first data block having a first block logical ID, the first data block having a first logical block address of the first storage medium, and the first data block corresponding to a first page table entry of the first storage medium;
identifying a second data block of the first storage medium having a second logical block address and having the first block logical ID; and
copying the second data block to the first data block based on the identified second data block.

18. The controller apparatus of claim 17, wherein the first page table entry is a first bottom level page table entry of a first bottom level page table, and wherein the second data block corresponds to a second bottom level page table entry of the first bottom level page table.

19. The controller apparatus of claim 18, wherein the identifying the first data error comprises scanning the first bottom level page table for the first block logical ID.

20. The controller apparatus of claim 17, wherein the first data block is stored in a first logical volume, the second data block is stored in a second logical volume, and wherein the first block logical ID is derived from data stored at the first data block.

* * * * *